United States Patent
Mola et al.

(10) Patent No.: US 10,642,737 B2
(45) Date of Patent: May 5, 2020

(54) LOGGING CACHE INFLUXES BY REQUEST TO A HIGHER-LEVEL CACHE

(71) Applicant: MICROSOFT TECHNOLOGY LICENSING, LLC, Redmond, WA (US)

(72) Inventors: Jordi Mola, Bellevue, WA (US); Henry Gabryjelski, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 193 days.

(21) Appl. No.: 15/947,699

(22) Filed: Apr. 6, 2018

(65) Prior Publication Data

US 2019/0266086 A1 Aug. 29, 2019

Related U.S. Application Data

(63) Continuation-in-part of application No. 15/904,072, filed on Feb. 23, 2018, now Pat. No. 10,496,537.

(51) Int. Cl.
| | |
|---|---|
| G06F 12/0811 | (2016.01) |
| G06F 11/34 | (2006.01) |
| G06F 12/0808 | (2016.01) |
| G06F 11/36 | (2006.01) |
| G06F 11/30 | (2006.01) |

(52) U.S. Cl.
CPC ...... *G06F 12/0811* (2013.01); *G06F 11/3476* (2013.01); *G06F 11/3636* (2013.01); *G06F 12/0808* (2013.01); *G06F 11/3024* (2013.01); *G06F 11/3065* (2013.01); *G06F 2201/885* (2013.01)

(58) Field of Classification Search
None
See application file for complete search history.

(56) References Cited

U.S. PATENT DOCUMENTS

| | | |
|---|---|---|
| 4,598,364 A | 7/1986 | Gum et al. |
| 5,381,533 A | 1/1995 | Peleg et al. |
| 5,905,855 A | 5/1999 | Klaiber et al. |
| 5,944,841 A | 8/1999 | Christie |

(Continued)

OTHER PUBLICATIONS

"Non Final Office Action Issued in U.S. Appl. No. 16/029,372", dated Nov. 6, 2019, 38 Pages.

(Continued)

*Primary Examiner* — Jared I Rutz
*Assistant Examiner* — Marwan Ayash
(74) *Attorney, Agent, or Firm* — Workman Nydegger

(57) ABSTRACT

Trace logging based on an upper cache layer determining how to log an influx by a lower cache layer. A second cache receives, from a lower layer first cache, a logging request referencing a memory address. The second cache determines whether it has a cache line for the memory address. When the cache line is present, the second cache either forwards the request to a next logging cache layer or causes the cache line to be logged if second cache is the outermost logging layer. When the cache line isn't present, the second cache causes the cache line to be logged when the cache line isn't determined by the second cache to be logged, or when it is determined by the second cache to be logged but it is not determined whether the first cache is aware of a current value of the cache line in the second cache.

20 Claims, 9 Drawing Sheets

(56) References Cited

U.S. PATENT DOCUMENTS

| | | |
|---|---|---|
| 6,009,270 A | 12/1999 | Mann |
| 6,094,729 A | 7/2000 | Mann |
| 6,101,524 A | 8/2000 | Choi et al. |
| 6,167,536 A | 12/2000 | Mann |
| 6,351,844 B1 | 2/2002 | Bala |
| 6,634,011 B1 | 10/2003 | Peltier et al. |
| 6,728,949 B1 | 4/2004 | Bryant et al. |
| 6,854,108 B1 | 2/2005 | Choi |
| 7,055,070 B1 | 5/2006 | Uhler et al. |
| 7,089,400 B1 | 8/2006 | Pickett et al. |
| 7,178,133 B1 | 2/2007 | Thekkath |
| 7,181,728 B1 | 2/2007 | Thekkath |
| 7,448,025 B2 | 11/2008 | Kalafatis et al. |
| 7,620,938 B2 | 11/2009 | Edwards et al. |
| 7,676,632 B2 | 3/2010 | Miller |
| 7,877,630 B1 | 1/2011 | Favor et al. |
| 7,958,497 B1 | 6/2011 | Lindo et al. |
| 8,010,337 B2 | 8/2011 | Narayanan et al. |
| 8,423,965 B2 | 4/2013 | Goel et al. |
| 8,468,501 B2 | 6/2013 | Subhraveti |
| 8,484,516 B2 | 7/2013 | Giannini et al. |
| 8,499,200 B2 | 7/2013 | Cathro |
| 8,612,650 B1 | 12/2013 | Carrie et al. |
| 8,719,796 B2 | 5/2014 | Rosu et al. |
| 9,015,441 B2 | 4/2015 | Worthington et al. |
| 9,058,415 B1 | 6/2015 | Serebrin et al. |
| 9,268,666 B2 | 2/2016 | Law et al. |
| 9,300,320 B2 | 3/2016 | Ansari et al. |
| 9,361,228 B2 | 6/2016 | Turner et al. |
| 9,535,815 B2 | 1/2017 | Smith et al. |
| 9,569,338 B1 | 2/2017 | Bradbury et al. |
| 9,767,237 B2 | 9/2017 | Suresh et al. |
| 10,031,833 B2 | 7/2018 | Mola |
| 10,031,834 B2 | 7/2018 | Mola |
| 2001/0034854 A1 | 10/2001 | Mukherjee |
| 2002/0124237 A1 | 9/2002 | Sprunt et al. |
| 2002/0144101 A1 | 10/2002 | Wang et al. |
| 2003/0079205 A1 | 4/2003 | Miyao et al. |
| 2003/0126508 A1 | 7/2003 | Litt |
| 2004/0117690 A1 | 6/2004 | Andersson |
| 2004/0153635 A1 | 8/2004 | Kaushik et al. |
| 2005/0155019 A1 | 7/2005 | Levine et al. |
| 2005/0223364 A1 | 10/2005 | Peri et al. |
| 2006/0112310 A1 | 5/2006 | Mchale et al. |
| 2006/0230390 A1 | 10/2006 | Alexander et al. |
| 2007/0106827 A1 | 5/2007 | Boatright et al. |
| 2007/0130237 A1 | 6/2007 | Altman et al. |
| 2007/0150881 A1 | 6/2007 | Khawand et al. |
| 2007/0214342 A1 | 9/2007 | Newburn et al. |
| 2007/0220361 A1 | 9/2007 | Barnum et al. |
| 2008/0065810 A1 | 3/2008 | Spanel et al. |
| 2008/0091867 A1 | 4/2008 | Plondke et al. |
| 2008/0114964 A1 | 5/2008 | Davis et al. |
| 2008/0115113 A1 | 5/2008 | Codrescu et al. |
| 2008/0215920 A1 | 9/2008 | Mayer et al. |
| 2008/0250207 A1 | 10/2008 | Davis et al. |
| 2008/0256396 A1 | 10/2008 | Giannini et al. |
| 2008/0288826 A1 | 11/2008 | Nemoto |
| 2009/0037886 A1 | 2/2009 | Mccoy et al. |
| 2009/0144742 A1 | 6/2009 | Subhraveti et al. |
| 2010/0205484 A1 | 8/2010 | Dragicevic et al. |
| 2010/0250856 A1 | 9/2010 | Owen et al. |
| 2010/0251031 A1 | 9/2010 | Nieh et al. |
| 2010/0268995 A1 | 10/2010 | Goodman et al. |
| 2011/0271070 A1 | 11/2011 | Worthington et al. |
| 2011/0276761 A1 | 11/2011 | Saha et al. |
| 2011/0288847 A1 | 11/2011 | Narayanan et al. |
| 2012/0095728 A1 | 4/2012 | Ubukata |
| 2013/0036403 A1 | 2/2013 | Geist |
| 2013/0086567 A1 | 4/2013 | Inoue et al. |
| 2014/0059523 A1 | 2/2014 | Frazier et al. |
| 2014/0281710 A1 | 9/2014 | Cain et al. |
| 2014/0372987 A1 | 12/2014 | Strong et al. |
| 2015/0089155 A1 | 3/2015 | Busaba et al. |
| 2015/0089301 A1 | 3/2015 | Laurenti |
| 2015/0331804 A1 | 11/2015 | Vajapeyam |
| 2015/0355996 A1 | 12/2015 | Smith et al. |
| 2015/0378870 A1 | 12/2015 | Marron et al. |
| 2016/0292061 A1 | 10/2016 | Marron et al. |
| 2017/0052876 A1 | 2/2017 | Svensson et al. |
| 2017/0140082 A1 | 5/2017 | Suresh et al. |
| 2017/0161173 A1 | 6/2017 | Bradbury et al. |
| 2018/0060214 A1 | 3/2018 | Mola |
| 2018/0060215 A1 | 3/2018 | Mola |
| 2018/0253369 A1 | 9/2018 | O'dowd et al. |
| 2018/0314623 A1 | 11/2018 | Mola |
| 2019/0266090 A1 | 8/2019 | Mola |

OTHER PUBLICATIONS

Lee, et al., "Offline Symbolic Analysis to Infer Total Store Order", In Proceedings of IEEE 17th International Symposium on High Performance Computer Architecture, Feb. 12, 2011, pp. 357-368.

Wang, et al., "Restore: Symptom-Based Soft Error Detection in Microprocessors", In Journal of IEEE Transactions on Dependable and Secure Computing, vol. 3 , Issue: 3, Aug. 14, 2006, pp. 188-201.

"7 Recording Inferior's Execution and Replaying It", Retrieved From: https://web.archive.org/web/20161009233228/https://sourceware.org/gdb/onlinedocs/gdb/Process-Record-and-Replay.html, Retrieved On: May 27, 2016, 6 Pages.

"Non-final Office Action Issued in U.S. Appl. No. 15/349,555", dated Oct. 6, 2017, 22 Pages.

"Elm's Time Traveling Debugger", Retrieved From: https://web.archive.org/web/20160522023348/http://debug.elm-lang.org/, Retrieved On: May 22, 2016, 4 Pages.

"IntelliTrace", Retrieved From: https://web.archive.org/web/20160521122918/https://msdn.microsoft.com/en-us/library/dd264915.aspx, Retrieved Date: May 21, 2016, 5 Pages.

"Rr: Lightweight Recording & Deterministic Debugging", Retrieved From: https://web.archive.org/web/20160521063109/https://rr-project.org/, Retrieved on: May 21, 2016, 4 Pages.

"Non-Final Office Action Issued in U.S. Appl. No. 15/252,998", dated Sep. 20, 2017, 15 Pages.

"Non-final Office Action Issued in U.S. Appl. No. 15/253,027", dated Oct. 10, 2017, 25 Pages.

"Notice of Allowance Issued in U.S. Appl. No. 15/253,027", dated Mar. 21, 2018, 13 Pages.

"Notice of Allowance Issued in U.S. Appl. No. 15/349,555", dated Mar. 29, 2018, 21 Pages.

Barr, et al., "TARDIS: Affordable Time-Travel Debugging in Managed Runtimes", In Proceedings of the International Conference on Object Oriented Programming Systems Languages & Applications, Oct. 20, 2014, 16 Pages.

Bhansali, et al., "Framework for Instruction-level Tracing and Analysis of Program Executions", In Proceedings of the 2nd International Conference on Virtual Execution Environments, Jun. 14, 2006, pp. 154-163.

Brady, Fiorenza, "Cambridge University Study States Software Bugs Cost Economy $312 Billion Per Year", Retrieved From: http://www.prweb.com/releases/2013/1/prweb10298185.htm, Jan. 8, 2013, 4 Pages.

Charles, "Arun Kishan: Inside Windows 7—Farewell to the Windows Kernel Dispatcher Lock", Retrieved From: https://channel9.msdn.com/shows/Going+Deep/Arun-Kishan-Farewell-to-the-Windows-kernel-Dispatcher-Lock/, Aug. 6, 2009, 9 Pages.

Dimitrov, et al., "Time-Ordered Event Traces: A New Debugging Primitive for Concurrency Bugs", In Proceedings of IEEE International Parallel & Distributed Processing Symposium (IPDPS), May 16, 2011, pp. 311-321.

Guo, et al., "R2: An Application-Level Kernel for Record and Replay", In Proceedings of the 8th USENIX Symposium on Operating Systems Design and Implementation, Dec. 8, 2008, pp. 193-208.

Hower, et al., "Two Hardware-Based Approaches For Deterministic Multiprocessor Replay", Published in Communications of the ACM, vol. 52, Issue 6, Jun. 1, 2009, pp. 93-100.

(56) References Cited

OTHER PUBLICATIONS

Jiang, et al., "CARE: Cache Guided Deterministic Replay for Concurrent Java Programs", In Proceedings of the 36th International Conference on Software Engineering, May 31, 2014, 11 Pages.
King, et al., "Debugging Operating Systems With Time-Traveling Virtual Machines", In Proceedings of Annual USENIX Technical Conference, Apr. 10, 2005, pp. 1-15.
Kleen, Andi, "Adding Processor Trace Support to Linux", Retrieved From: https://lwn.net/Articles/648154/, Jul. 1, 2015, 7 Pages.
Lai, et al., "A Versatile Data Cache for Trace Buffer Support", In Journal of IEEE Transactions on Circuits and Systems, vol. 61, Issue 11, Nov. 2014, pp. 3145-3154.
Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.
Liang, et al., "Improved Procedure Placement for Set Associative Caches", In Proceedings of the International Conference on Compilers, Architectures and Synthesis for Embedded Systems, Oct. 24, 2010, pp. 147-156.
Liang, et al., "Instruction Cache Locking Using Temporal Reuse Profile", In Proceedings of the 47th Design Automation Conference, Jun. 13, 2010, pp. 344-349.
Mercer, et al., "Model Checking Machine Code with the GNU Debugger", In Proceedings of the 12th International Conference on Model Checking Software, Aug. 22, 2005, 15 Pages.
Xu, et al., "ReTrace: Collecting Execution Trace with Virtual Machine Deterministic Replay", In Proceedings of the Third Annual Workshop on Modeling, Benchmarking and Simulation, Jan. 1, 2007, 8 Pages.
Narayanasamy, et al., "BugNet: Continuously Recording Program Execution for Deterministic Replay Debugging", In Proceedings of the 32nd Annual International Symposium on Computer Architecture, Jun. 4, 2005, 12 Pages.
"International Search Report and Written Opinion Issued in PCT Application No. PCT/US2017/048094", dated Nov. 10, 2017, 12 Pages.
"International Search Report and Written Opinion Issued in PCT Application No. PCT/US2017/060075", dated Feb. 28, 2018, 11 Pages.
Rivers, et al., "Utilizing Reuse Information in Data Cache Management", In Proceedings of the 12th International Conference on Supercomputing, Jul. 13, 1998, pp. 449-456.
Sahuquillo, et al., "The Filter Cache: A Run-Time Cache Management Approach", In Proceedings of 25th EUROMICRO Conference, Sep. 8, 1999, 8 Pages.
Shaaban, et al., "Improving Trace Cache Hit Rates Using the Sliding Window Fill Mechanism and Fill Select Table", In Proceedings of the Workshop on Memory System Performance, Jun. 8, 2004, pp. 36-41.
Sharma, Suchakrapani Datt., "Hardware Tracing with Intel Processor Trace", Retrieved From: http://hsdm.dorsal.polymtl.ca/system/files/10Dec2015_0.pdf, Dec. 10, 2015, 30 Pages.
Tchagou, et al., "Reducing Trace Size in Multimedia Applications Endurance Tests", In Proceedings of Design, Automation & Test in Europe Conference & Exhibition (DATE), Mar. 9, 2015, 2 Pages.
Uzelac, et al., "Hardware-Based Load Value Trace Filtering for On-the-Fly Debugging", In Proceedings of ACM Transactions on Embedded Computing Systems, vol. 12, Issue 2, Article 97, May 2013, 18 pages.
"International Search Report and Written Opinion Issued in PCT Application No. PCT/US19/017912", dated May 21, 2019, 14 Pages.
Ponugoti, et al., "Exploiting cache coherence for effective on-the-fly data tracing in multicores", In Proceedings of IEEE 34th International Conference On Computer Design(ICCD), Oct. 2, 2016, pp. 312-319.
"International Search Report and Written Opinion Issued in PCT Application No. PCT/US2019/017737", dated May 3, 2019, 12 Pages.

LOGGING CACHE INFLUXES BY REQUEST TO A HIGHER-LEVEL CACHE

CROSS-REFERENCE TO RELATED APPLICATION

This application is a continuation-in-part of U.S. patent application Ser. No. 15/904,072, filed Feb. 23, 2018, and titled "TRACE RECORDING BY LOGGING INFLUXES TO A LOWER-LAYER CACHE BASED ON ENTRIES IN AN UPPER-LAYER CACHE," the entire contents of which are incorporated by reference herein in their entirety.

BACKGROUND

When writing code during the development of software applications, developers commonly spend a significant amount of time "debugging" the code to find runtime and other source code errors. In doing so, developers may take several approaches to reproduce and localize a source code bug, such as observing the behavior of a program based on different inputs, inserting debugging code (e.g., to print variable values, to track branches of execution, etc.), temporarily removing code portions, etc. Tracking down runtime errors to pinpoint code bugs can occupy a significant portion of application development time.

Many types of debugging applications ("debuggers") have been developed in order to assist developers with the code debugging process. These tools offer developers the ability to trace, visualize, and alter the execution of computer code. For example, debuggers may visualize the execution of code instructions, may present code variable values at various times during code execution, may enable developers to alter code execution paths, and/or may enable developers to set "breakpoints" and/or "watchpoints" on code elements of interest (which, when reached during execution, causes execution of the code to be suspended), among other things.

An emerging form of debugging applications enable "time travel," "reverse," or "historic" debugging. With "time travel" debugging, execution of a program (e.g., executable entities such as threads) is recorded/traced by a trace application into one or more trace files. These trace file(s) can then be used to replay execution of the program later, for both forward and backward analysis. For example, "time travel" debuggers can enable a developer to set forward breakpoints/watchpoints (like conventional debuggers) as well as reverse breakpoints/watchpoints.

Several considerations can be taken into account when recording trace files. Most prominently, there is an inherent tradeoff between the robustness of the trace data recorded and the overheads incurred by tracing a program. These tradeoffs are manifest primarily in trace file size and performance impacts on execution of the traced program. Moreover, since tracing might be accomplished with hardware assistance (or entirely in software), there may also be hardware design and other hardware cost considerations.

BRIEF SUMMARY

Embodiments described herein are directed to mechanisms for creating bit-accurate "time travel" trace recordings using hardware assistance by a processor. These mechanisms are based on tracing the effects of execution across a plurality of processing units using at least two tiers or layers of processor caches. One mechanism modifies a processor's hardware and/or microcode so that when it detects an influx (i.e., cache miss) to an inner or "lower-layer" processor cache based on activity by a traced processing unit, it checks one or more outer or "upper-layer" shared processor cache to determine if data of that influx has already been logged on behalf of another traced processing unit. Another mechanism modifies a processor's hardware and/or microcode so that one or more cache layers are configured to receive logging requests from lower cache layer(s) and use their knowledge of logged cache lines to determine how an influx to a lower cache layer should be logged (if at all). Either mechanism might enable the influx can be logged by reference to the prior log entry, and each mechanism could be extended to "N" levels of caches. Recording trace files in using either mechanism may need only modest processor modifications and, when compared to prior trace recording approaches, they can reduce by several orders of magnitude both the performance impact of trace recording as well as trace file size.

First embodiments are directed to computing device(s) that include a plurality of processing units, a plurality of N-level caches, and an (N+i)-level cache. The (N+i)-level cache is associated with two or more of the plurality of N-level caches and is configured as a backing store for the plurality of N-level caches. In these embodiments, the computing device(s) include control logic that configures the computing device(s) to detect an influx to a first N-level cache of plurality of N-level caches and in which the influx comprises data stored at a memory location. The control logic also configures the computing device(s) to check the (N+i)-level cache to determine if the data for the memory location has been previously logged on behalf of a second processing unit. The control logic also configures the computing device(s), based on this check, to perform one of (i) causing the data for the memory location to be logged on behalf of the first processing unit by reference to log data that was previously logged on behalf of the second processing unit (i.e., when the data for the memory location has been previously logged on behalf of the second processing unit), or (ii) causing the data for the memory location to be logged by value on behalf of the first processing unit (i.e., when the data for the memory location has not been previously logged on behalf of the second processing unit).

Second embodiments are directed to computing device(s) that include a plurality of processing units and a plurality of caches arranged into a plurality of cache layers. The plurality of caches include a plurality of first caches within a first cache layer, and one or more second caches within a second cache layer. A particular second cache in the second cache layer serves as a backing store for at least a particular first cache in the first cache layer. In these embodiments, the computing device(s) include control logic that configures at least the particular second cache to receive, from the particular first cache, a logging request referencing a particular memory address. Based on the request, the particular second cache determines whether a cache line corresponding to the memory address is present in the particular second cache. When the cache line is not present in the particular second cache, the second cache either (i) causes the cache line to be logged when there does not exist a third cache that participates in logging and that serves as a backing store for at least the particular second cache; or it (ii) forwards the request to the third cache when the third cache does exist.

When the cache line is present in the particular second cache, the second cache either (i) causes the cache line to be logged when the cache line is not determined by the particular second cache to be logged, or is determined by the particular second cache to be logged but the particular second cache has not determined that the first cache is aware of a current value stored in the cache line of the particular second cache; or it (ii) determines that cache line need not be logged when the cache line is determined by the particular second cache to be logged, and it is determined that the first cache is aware of the current value stored in the cache line of the particular second cache.

Any of the embodiments described herein may also be implemented as method(s) performed by computing device(s) (e.g., such as microprocessors) and/or computer-executable instructions (e.g., processor microcode) stored on a hardware storage device, and that are executable to perform the method(s).

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments described herein are directed to mechanisms for creating bit-accurate "time travel" trace recordings using hardware assistance by a processor. These mechanisms are based on tracing the effects of execution across a plurality of processing units using at least two tiers or layers of processor caches. One mechanism modifies a processor's hardware and/or microcode so that when it detects an influx (i.e., cache miss) to an inner or "lower-layer" processor cache based on activity by a traced processing unit, it checks one or more outer or "upper-layer" shared processor cache to determine if data of that influx has already been logged on behalf of another traced processing unit. Another mechanism modifies a processor's hardware and/or microcode so that one or more cache layers are configured to receive logging requests from lower cache layer(s) and use their knowledge of logged cache lines to determine how an influx to a lower cache layer should be logged (if at all). Either mechanism might enable the influx can be logged by reference to the prior log entry, and each mechanism could be extended to "N" levels of caches. Recording trace files in using either mechanism may need only modest processor modifications and, when compared to prior trace recording approaches, they can reduce by several orders of magnitude both the performance impact of trace recording as well as trace file size.

Figure 1:
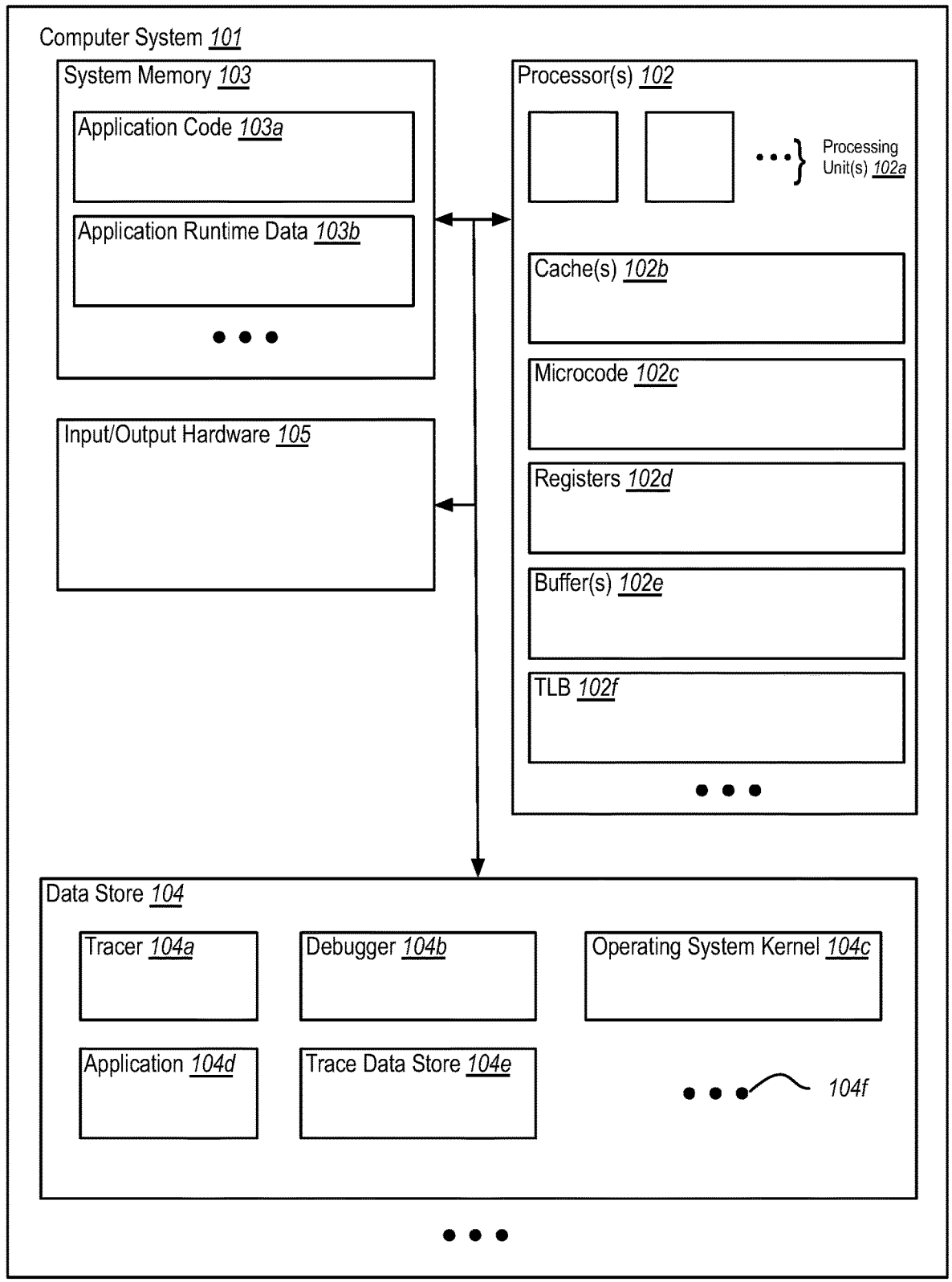
FIG. 1 illustrates an example computing environment that facilitates recording "bit-accurate" traces of execution across a plurality of processing units, using at least two tiers or layers of processor caches.

FIG. 1 illustrates an example computing environment 100 that facilitates recording "bit-accurate" traces of execution across a plurality of processing units, using at least two tiers or layers of processor caches. As depicted, embodiments may comprise or utilize a special-purpose or general-purpose computer system 101 that includes computer hardware, such as, for example, one or more processor(s) 102, system memory 103, one or more data stores 104, and/or input/output hardware 105.

Embodiments within the scope of the present invention include physical and other computer-readable media for carrying or storing computer-executable instructions and/or data structures. Such computer-readable media can be any available media that can be accessed by the computer system 101. Computer-readable media that store computer-executable instructions and/or data structures are computer storage devices. Computer-readable media that carry computer-executable instructions and/or data structures are transmission media. Thus, by way of example, and not limitation, embodiments of the invention can comprise at least two distinctly different kinds of computer-readable media: computer storage devices and transmission media.

Computer storage devices are physical hardware devices that store computer-executable instructions and/or data structures. Computer storage devices include various computer hardware, such as RAM, ROM, EEPROM, solid state drives ("SSDs"), flash memory, phase-change memory ("PCM"), optical disk storage, magnetic disk storage or other magnetic storage devices, or any other hardware device(s) which can be used to store program code in the form of computer-executable instructions or data structures, and which can be accessed and executed by the computer system 101 to implement the disclosed functionality of the invention. Thus, for example, computer storage devices may include the depicted system memory 103, the depicted data store 104 which can store computer-executable instructions and/or data structures, or other storage such as on-processor storage, as discussed later.

Transmission media can include a network and/or data links which can be used to carry program code in the form of computer-executable instructions or data structures, and which can be accessed by the computer system 101. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media. For example, the input/output hardware 105 may comprise hardware (e.g., a network interface module (e.g., a "NIC")) that connects a network and/or data link which can be used to carry program code in the form of computer-executable instructions or data structures.

Further, upon reaching various computer system components, program code in the form of computer-executable instructions or data structures can be transferred automatically from transmission media to computer storage devices (or vice versa). For example, computer-executable instructions or data structures received over a network or data link can be buffered in RAM within a NIC (e.g., input/output hardware 105), and then eventually transferred to the system memory 103 and/or to less volatile computer storage devices (e.g., data store 104) at the computer system 101. Thus, it should be understood that computer storage devices can be included in computer system components that also (or even primarily) utilize transmission media.

Computer-executable instructions comprise, for example, instructions and data which, when executed at the processor(s) 102, cause the computer system 101 to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

FIG. 1 includes a simplified representation of the internal hardware components of the processor(s) 102. As illustrated, each processor 102 includes a plurality of processing unit(s) 102a. Each processing unit may be physical (i.e., a physical processor core) and/or logical (i.e., a logical core presented by a physical core that supports hyper-threading, in which more than one application threads executes at the physical core). Thus, for example, even though the processor 102 may in some embodiments include only a single physical processing unit (core), it could include two or more logical processing units 102a presented by that single physical processing unit.

Each processing unit 102a executes processor instructions that are defined by applications (e.g., tracer 104a, debugger 104b, operating kernel 104c, application 104d, etc.), and which instructions are selected from among a predefined processor instruction set architecture (ISA). The particular ISA of each processor 102 varies based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, an "instruction" is the smallest externally-visible (i.e., external to the processor) unit of code that is executable by a processor.

Each processing unit 102a obtains processor instructions from one or more processor cache(s) 102b, and executes the processor instructions based on data in the cache(s) 102b, based on data in registers 102d, and/or without input data. In general, each cache 102b is a small amount (i.e., small relative to the typical amount of system memory 103) of random-access memory that stores on-processor copies of portions of a backing store, such as the system memory 103 and/or another cache in the cache(s) 102b. For example, when executing the application code 103a, one or more of the cache(s) 102b contain portions of the application runtime data 103b. If the processing unit(s) 102a request data not already stored in a particular cache 102b, then a "cache miss" occurs, and that data is fetched from the system memory 103 or another cache, potentially "evicting" some other data from that cache 102b.

Figure 2A:
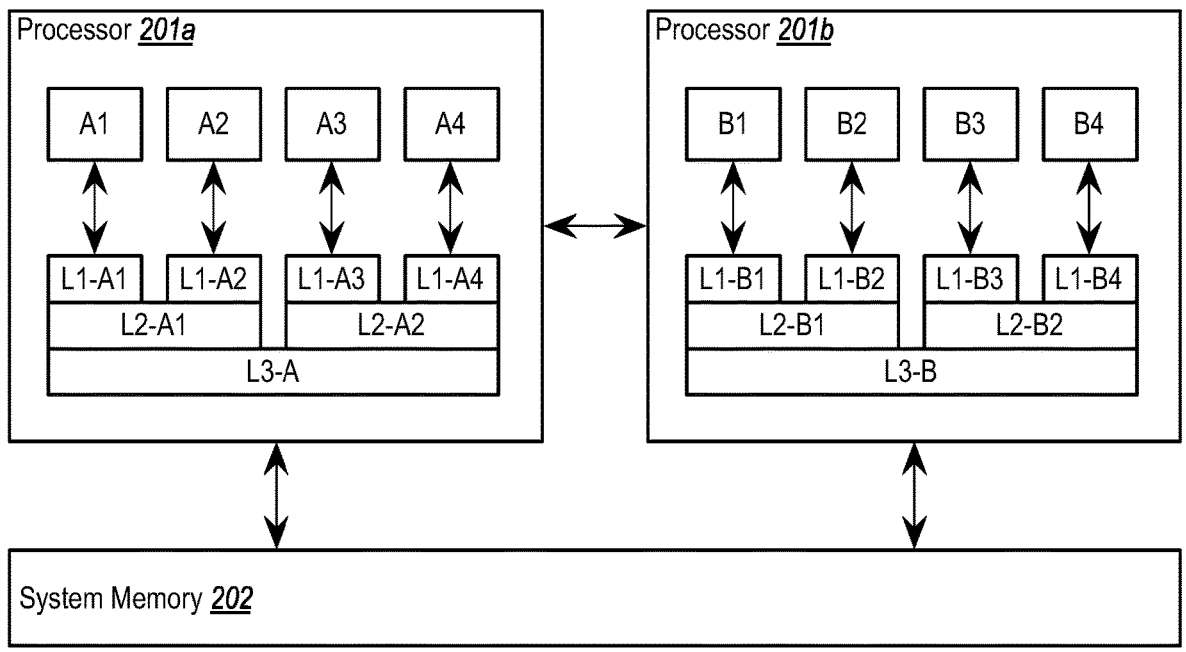
FIG. 2A illustrates an example computing environment including multi-layer caches.

Often times, the processor cache(s) 102b are divided into separate tiers, layers, or levels—such as layer 1 (L1), layer 2 (L2), layer 3 (L3), etc. Depending on processor implementation, tiers could be part of the processor 102, itself (e.g., L1 and L2), and/or could be separate from the processor 102 (e.g., L3). Thus, the cache(s) 102b of FIG. 1 may comprise one of these layers (L1) or may comprise a plurality of these layers (e.g., L1 and L2, and even L3). To understand these concepts further, FIG. 2A illustrates an example environment 200 demonstrating multi-layer caches. In FIG. 2A, there are two processors 201a and 201b (e.g., each corresponding to a different processor 102 of FIG. 1) and a system memory 202 (e.g., corresponding to system memory 103 of FIG. 1). In the example environment 200, each processor 201 includes four physical processing units (i.e., units A1-A4 for processor 201a and units B1-B4 for processor 210b).

Example environment 200 also includes a three-layer cache hierarchy within each processing unit 201. Environment 200 is one example layout only, and it is not limiting to the cache hierarchies in which the embodiments herein may operate. In environment 200, at a lowest or most inner layer each processing unit is associated with its own dedicated L1 cache (e.g., L1 cache "L1-A1" in processor 201a for unit A1, L1 cache "L1-A2" in processor 201a for unit A2, etc.). Moving up a layer, each processing unit 201 includes two L2 caches (e.g., L2 cache "L2-A1" in processor 201a that serves as a backing store for L1 caches L1-A1 and L1-A2, L2 cache "L1-A2" in processor 201a that serves as a backing store for L1 caches L1-A3 and L1-A4, etc.). Finally, at the highest or most outer layer, each processing unit 201 includes a single L3 cache (e.g., L3 cache "L3-A" in processor 201a that serves as a backing store for L2 caches L2-A1 and L2-A2, and L3 cache "L3-B" in processor 201b that serves as a backing store for L2 caches L2-B1 and L2-B2). As shown, system memory 202 serves as a backing store for the L3 caches L3-A and L3-B.

As demonstrated in FIG. 2A, when multiple cache layers are used, the processing unit(s) 102a typically interact directly with the lowest layer (L1). In most cases, data flows between the layers (e.g., on a read an L3 cache interacts with the system memory 103 and serves data to an L2 cache, and the L2 cache in turn serves data to the L1 cache). When a processing unit 102a performs a write, the caches coordinate to ensure that those caches that have affected data that was shared among the processing unit(s) 102a don't have it anymore. This coordination is performed using a CCP.

The caches in environment 200 may thus be viewed as "shared" caches. For example, each L2 and L3 cache serves multiple processing units within a given processor 201 and are thus shared by the processing units. The L1 caches within a given processor 201, collectively, can also be considered shared—even though each one corresponds to a single processing unit—because the individual L1 caches may coordinate with each other (i.e., via a CCP) to ensure consistency (i.e., so that each cached memory location is viewed consistently across all the L1 caches). The L2 caches within each processor 201 similarly may coordinate via a CCP. Additionally, if the processor 201 supports hyper-threading, each individual L1 cache may be viewed being shared by two or more logical processing units and are thus "shared" even at an individual level.

Figure 2B:
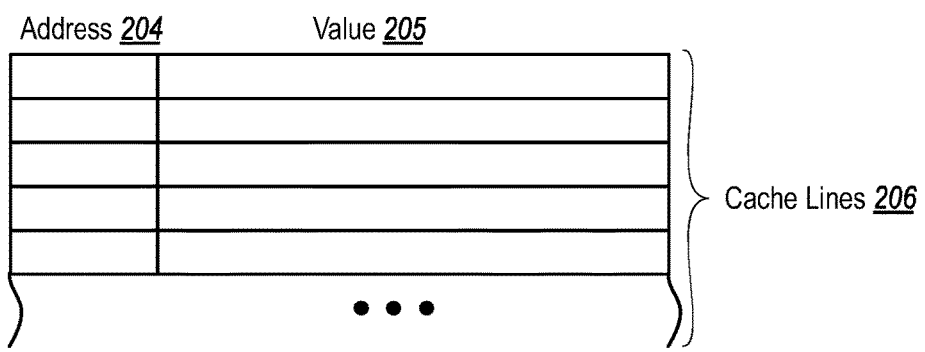
FIG. 2B illustrates an example of a cache.

Typically, each cache comprises a plurality of "cache lines." Each cache line stores a chunk of memory from its backing store (e.g., system memory 202 or a higher-layer cache). For example, FIG. 2B illustrates an example of at least a portion of a cache 203, which includes a plurality of cache lines 206, each of which comprises at least an address portion 204 and a value portion 205. The address portion 204 of each cache line 206 is configured to store an address in system memory 202 for which the cache line corresponds, and the value portion 205 initially stores a value received from the system memory 202. The value portion 205 can be modified by the processing units, and eventually be evicted back to the backing store. As indicated by the ellipses, a cache 203 can include a large number of cache lines. For example, a contemporary 64-bit INTEL processor may contain individual L1 caches comprising 512 or more cache lines. In such a cache, each cache line is typically usable to store a 64-byte (512-bit) value in reference to a 6-byte (48-bit) to 8-byte (64-bit) memory address. As visually indicated in FIG. 2A, cache sizes typically increase with each layer (i.e., L2 caches are typically larger than L1 caches, L3 caches are typically larger than L2 caches, etc.).

The address stored in the address portion 204 of each cache line 206 may be a physical address, such as the actual memory address in the system memory 202. Alternatively, the address stored in the address portion 204 may be a virtual address, which is an address that is mapped to the physical address to provide an abstraction (e.g., using operation-system managed page tables). Such abstractions can be used, for example, to facilitate memory isolation between different processes executing at the processor(s) 102, including isolation between user-mode processes and kernel mode processes associated with the operating system kernel 104b. When virtual addresses are used, a processor 102 may include a translation lookaside buffer (TLB) 102f (usually part of a memory management unit (MMU)), which maintains recently-used memory address mappings between physical and virtual addresses.

The cache(s) 102b may include code cache portions and data cache portions. When executing the application code 103a, the code portion(s) of the cache(s) 102b may store at least a portion of the processor instructions stored in the application code 103a and the data portion(s) of the cache(s) 102b may store at least a portion of data structures of the application runtime data 103b. In addition, caches can be inclusive, exclusive, or include both inclusive and exclusive behaviors. For example, in an inclusive cache an L3 layer would typically store a superset of the data in the L2 layers below it, and the L2 layers store a superset of the L1 layers below them. In exclusive caches, the layers may be disjointed—for example, if data exists in an L3 cache that an L1 cache needs, they may swap information, such as data, address, and the like.

Retuning to FIG. 1, each processor 102 also includes microcode 102c, which comprises control logic (i.e., executable instructions) that control operation of the processor 102, and which generally functions as an interpreter between the hardware of the processor and the processor ISA exposed by the processor 102 to executing applications. The microcode 102 is typically embodied on on-processor storage, such as ROM, EEPROM, etc.

Registers 102d are hardware-based storage locations that are defined based on the ISA of the processors(s) 102 and that are read from and/or written to by processor instructions. For example, registers 102d are commonly used to store values fetched from the cache(s) 102b for use by instructions, to store the results of executing instructions, and/or to store status or state—such as some of the side-effects of executing instructions (e.g., the sign of a value changing, a value reaching zero, the occurrence of a carry, etc.), a processor cycle count, etc. Thus, some registers 102d may comprise "flags" that are used to signal some state change caused by executing processor instructions. In some embodiments, processors 102 may also include control registers, which are used to control different aspects of processor operation. Although FIG. 1 depicts registers 102d as a single box, it will be appreciated that each processing unit 102a typically includes one or more corresponding sets of registers 102d that are specific to that processing unit.

In some embodiments, the processor(s) 102 may include one or more buffers 102e. As will be discussed herein after, buffer(s) 102e may be used as a temporary storage location for trace data. Thus, for example, the processors(s) 102 may store portions of trace data in the buffer(s) 102e, and flush that data to the trace data store 104e at appropriate times, such as when there is available memory bus bandwidth and/or free processor cycles.

As alluded to above, processors operate on the cache(s) 102b according to one or more CCPs. In general, a CCP defines how consistency is maintained between data among the various cache(s) 102b as the various processing units 102a read from and write to data in the various cache(s) 102b, and how to ensure that the various processing units 102a always read valid data from a given location in the cache(s) 102b. CCPs are related to, and enable, a memory model defined by the processor 102's ISA.

Examples of common CCPs include the MSI protocol (i.e., Modified, Shared, and Invalid), the MESI protocol (i.e., Modified, Exclusive, Shared, and Invalid), and the MOESI protocol (i.e., Modified, Owned, Exclusive, Shared, and Invalid). Each of these protocols define a state for individual locations (e.g., lines) in the cache(s) 102b. A "modified" cache location contains data that has been modified in the cache(s) 102b and is therefore potentially inconsistent with the corresponding data in the backing store (e.g., system memory 103 or another cache). When a location having the "modified" state is evicted from the cache(s) 102b, common CCPs require the cache to guarantee that its data is written back the backing store, or that another cache take over this responsibility. A "shared" cache location contains data that is unmodified from the data in the backing store, exists in read-only state, and is shared by the processing unit(s) 102a. The cache(s) 102b can evict this data without writing it to the backing store. An "invalid" cache location contains no valid data and can be considered empty and usable to store data from cache miss. An "exclusive" cache location contains data that matches the backing store and is used by only a single processing unit 102a. It may be changed to the "shared" state at any time (i.e., in response to a read request) or may be changed to the "modified" state when writing to it. An "owned" cache location is shared by two or more processing units 102a, but one of the processing units has the exclusive right to make changes to it. When that processing makes changes, it may notify the other processing units—since the other processing units may need to invalidate or update their own cache, based on the CCP implementation.

The data store 104 can store computer-executable instructions representing application programs such as, for example, a tracer 104a, a debugger 104b, an operating system kernel 104c, and an application 104d (e.g., the application that is the subject of tracing by the tracer 104a). When these programs are executing (e.g., using the processor(s) 102), the system memory 103 can store corresponding runtime data, such as runtime data structures, computer-executable instructions, etc. Thus, FIG. 1 illustrates the system memory 103 as including application code 103a and application runtime data 103b (e.g., each corresponding with application 104g). The data store 104 can further store data structures, such as trace data stored within one or more trace data stores 104e. As indicated by the ellipses 104f, the data store 104 could also store other computer-executable instructions and/or data structures.

The tracer 104a is usable to record a bit-accurate trace of execution of one or more entities, such as one or more threads of an application 104d or kernel 104c, and to store the trace data into the trace data store 104e. In some embodiments, the tracer 104a is a standalone application, while in other embodiments the tracer 104a is integrated into another software component, such as the kernel 104c, a hypervisor, a cloud fabric, etc. While the trace data store 104e is depicted as being part of the data store 104, the trace data store 104e may also be embodied, as least in part, in the system memory 103, in the cache(s) 102b, in the buffer(s) 102e, or at some other storage device.

As mentioned, the tracer 104a records a bit-accurate trace of execution of one or more entities. As used herein, a "bit accurate" trace is a trace that includes sufficient data to enable code that was previously executed at one or more processing units 102a to be replayed, such that it executes in substantially the same manner at replay time as it did during tracing. There are a variety of approaches the tracer 104a might use to record bit-accurate traces, with various benefits and drawbacks for each (e.g., in terms of tracing overheads, trace file size, an amount of processor modification required, etc.). Some particular embodiments for recording such data are discussed later in connection with FIGS. 3-9.

Regardless of the recording approach used by the tracer 104a, it can record the trace data into the one or more trace data stores 104e. As examples, a trace data store 104e may include one or more trace files, one or more areas of system memory 103, one or more areas of a processor cache 102b (e.g., L2 or L3 cache), a buffer 102d in processor 102, or any combination or multiple thereof. A trace data store 104e could include one or more trace data streams. In some embodiments, for example, multiple entities (e.g., processes, threads, etc.), could each be traced to a separate trace file or a trace data stream within a given trace file. Alternatively, data packets corresponding to each entity could be tagged such that they are identified as corresponding to that entity. If multiple related entities are being traced (e.g., plural threads of the same process), the trace data for each entity could be traced independently (enabling them to be replayed independently), though any events that are orderable across the entities (e.g., access to shared memory) can be identified with a sequencing number (e.g., a monotonically incrementing number) that is global across the independent traces. The trace data store 104e can be configured for flexible management, modification, and/or creation of trace data streams. For example, modification of an existing trace data stream could involve modification of an existing trace file, replacement of sections of trace data within an existing file, and/or creation of a new trace file that includes the modifications.

In some implementations, the tracer 104a can continually append to trace data stream(s) such that trace data continually grows during tracing. In other implementations, however, the trace data streams could be implemented as one or more ring buffers. In such implementation, the oldest trace data is removed from the data stream(s) as new trace data is added to the trace data store 104e. As such, when the trace data streams are implemented as buffer(s), they contain a rolling trace of the most recent execution at the traced process(es). Use of ring buffers may enable the tracer 104a to engage in "always on" tracing, even in production systems. In some implementations, tracing can be enabled and disabled at practically any time, such as by setting or clearing one or more bits in one or more control registers. As such, whether tracing to a ring buffer or appending to a traditional trace data stream, the trace data could include gaps between periods during which tracing is enabled for one or more of the processing units 102a.

The debugger 104b is usable to consume (e.g., replay) the trace data generated by the tracer 104a into the trace data store 104e in order to assist a user in performing debugging actions on the trace data (or derivatives thereof). For example, the debugger 104b could present one or more debugging interfaces (e.g., user interfaces and/or application programming interfaces), replay prior execution of one or more portions of the application 104d, set breakpoints/watchpoints including reverse breakpoints/watchpoints, enable queries/searches over the trace data, etc.

Returning to the tracer 104a, in the embodiments herein the tracer 104a utilizes the processor 102's cache(s) 102b to efficiently record a bit-accurate trace of execution of application 104d and/or the operating system kernel 104c. These embodiments are built upon an observation by the inventor that the processor 102 (including the cache(s) 102b) form a semi- or quasi-closed system. For example, once portions of data for a process (i.e., code data and runtime application data) are loaded into the cache(s) 102b, the processor 102 can run by itself—without any input—as a semi- or quasi-closed system for bursts of time. In particular, once the cache(s) 102b are loaded with data, one or more of the processing units 102a execute instructions from the code portion(s) of the cache(s) 102b, using runtime data stored in the data portion(s) of the cache(s) 102b and using the registers 102d.

When a processing unit 102a needs some influx of information (e.g., because an instruction it is executing, will execute, or may execute accesses code or runtime data not already in the cache(s) 102b), a "cache miss" occurs and that information is brought into the cache(s) 102b from the system memory 103. For example, if a data cache miss occurs when an executed instruction performs a memory operation at a memory address within the application runtime data 103b, data from that memory address is brought into one of the cache lines of the data portion of the cache(s) 102b. Similarly, if a code cache miss occurs when an instruction performs a memory operation at a memory address application code 103a stored in system memory 103, code from that memory address is brought into one of the cache lines of the code portion(s) of the cache(s) 102b. The processing unit 102a then continues execution using the new information in the cache(s) 102b until new information is again brought into the cache(s) 102b (e.g., due to another cache miss or an un-cached read).

The inventor has also observed that, in order to record a bit-accurate representation of execution of an application, the tracer 104a can record sufficient data to be able to reproduce the influx of information into the cache(s) 102b as processing units execute that application's thread(s). For example, one approach to recording these influxes operates on a per-processing-unit basis and at the innermost cache layer (e.g., L1). This approach may involve recording, for each processing unit that is being traced, all cache misses and un-cached reads (i.e., reads from hardware components and un-cacheable memory) associated with that processing unit's L1 cache, along with a time during execution at which each piece of data was brought into that processing unit's L1 cache (e.g., using a count of instructions executed or some other counter). If there are events that can be ordered across the processing units (e.g., accesses to shared memory), these events can be logged across the resulting data streams (e.g., by using a monotonically incrementing (or decrementing) number (MIN) across the data streams).

However, because an L1 cache layer may include multiple distinct L1 caches that are each associated a different physical processing unit (e.g., as shown in FIG. 2A), recording in this manner may record duplicate data—and thus more data than is strictly necessary for a "full-fidelity" trace. For example, if multiple physical processing units read from the same memory location (which may be a frequent occurrence in multi-threaded applications) this approach may log cache misses for the same memory location and data for each of multiple physical processing units. Notably, as used herein, a "full-fidelity" trace is any trace that contains sufficient information to enable a full replay of a traced entity—even though a particular "full-fidelity" trace may actually contain less data that encapsulates the same information than might be recorded using alternate tracing techniques.

In order to further reduce trace file size, the inventor has developed improved recording techniques that utilize one or more of the upper-layer caches to avoid recording at least a portion of this duplicate data. Instead, these improved techniques can log by reference to previously-logged data, or avoid logging altogether in many situations.

Logging Cache Misses at a Lower Cache Layer Based on a Processor Checking Knowledge of One or More Upper Cache Layers In a first embodiment, a processor detects an influx (i.e., cache miss) to an inner or "lower-layer" processor cache (e.g., L1) based on activity by a first processing unit (such as a read from a particular memory address), and then checks one or more outer or "upper-layer" shared processor cache(s) to determine if an influx of the same data (i.e., the same memory address and the same value that was read by first processing unit) has already been logged on behalf of a second traced processing unit. If so, the processor can log this latter influx by the first processing by reference to the prior influx by the second processing unit, when possible.

In order to understand these embodiments, it is noted that, in most environments, an upper-layer cache is larger than lower-layer caches below it, and it frequently is a backing store for multiple lower-layer caches. For example, in the example environment of FIG. 2A, each L2 cache is a backing store for two L1 caches, and each L3 cache is a backing store for two L2 caches (and, by extension, four L1 caches). Thus, an upper-layer cache can retain knowledge about multiple lower-layer caches (e.g., in FIG. 2A, L2 cache L1-A1 can retain knowledge about L1 caches L1-A1 and L1-A2, L2 cache L1-A2 can retain knowledge about L1 caches L1-A3 and L1-A4, and L3 cache L3-A can retain knowledge about L2 caches L2-A1 and L2-A1 as well as L1 caches L1-A1, L1-A2, L1-A3, and L1-A4). By utilizing the knowledge of one or more upper cache layers, the embodiments herein and enable many opportunities for logging influxes caused by one processing unit by reference to an influx already logged on behalf of another processing units.

Figure 3:
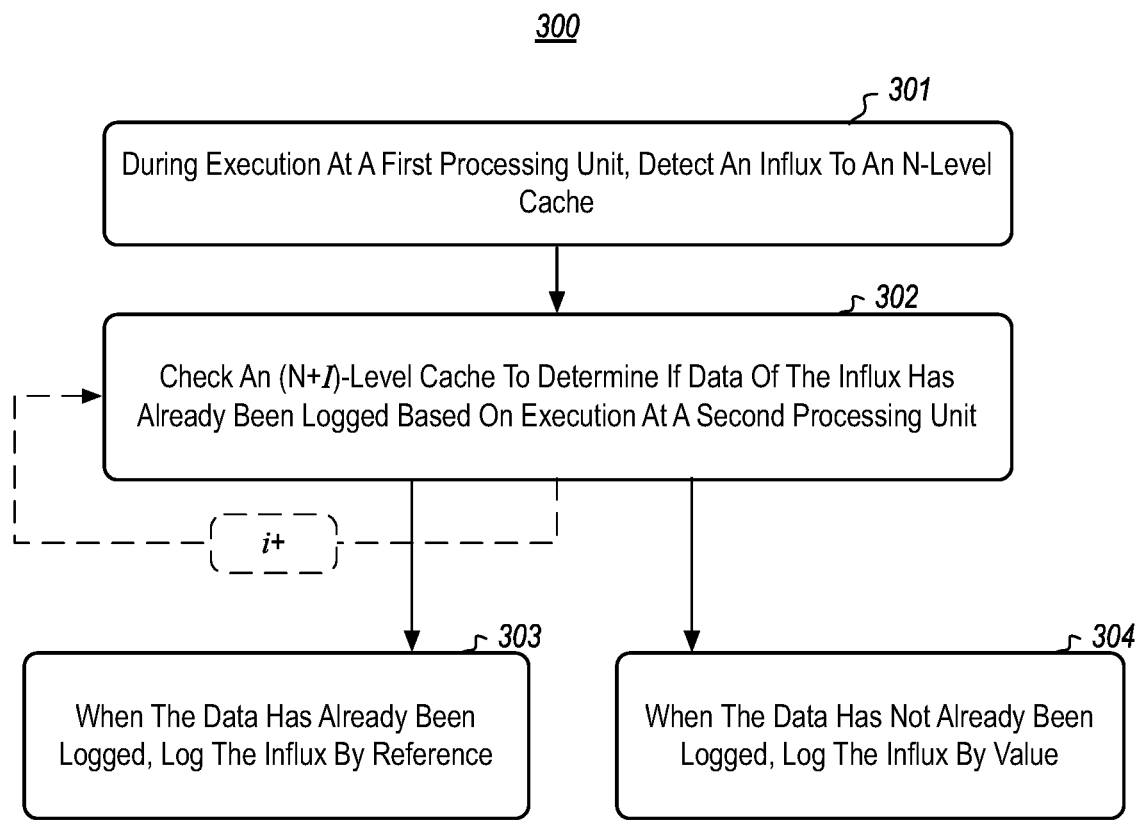
FIG. 3 illustrates a flowchart of an example method for trace recording based on recording an influx to a lower-level cache by reference to prior log data based on knowledge of one or more upper-level caches.

In accordance with these first embodiments, FIG. 3 illustrates an example of a method 300 for trace recording based on recording an influx to a lower-level cache by reference to prior log data based on knowledge of one or more upper-level caches. FIG. 3 is now described in the context of FIGS. 1 and 2.

In particular, FIG. 3 operates in environments, such as a processor 102 or 201a that includes a plurality of processing units, a plurality of N-level caches, and an (N+i)-level cache that is associated with two or more of the plurality of N-level caches, and that is configured as a backing store for the plurality of N-level caches. In method 300 (and in the claims), N and i are positive integers—i.e., N≥1, such that N equals 1, 2, 3, etc.; and i≥1, such that i equals 1, 2, 3, etc. For example, referring to processor 201a of FIG. 2A, the processor includes a plurality of processing units A1, A2, etc. The processor 201a also includes a plurality of N-level caches L1-A1, L1-A2, etc. (i.e., where N equals 1). The processor 201a also includes an (N+i)-level cache that is associated with two or more of the plurality of N-level caches, and that is configured as a backing store for the plurality of N-level caches. For example, processor 201a includes an (N+i)-level cache L2-A1 that is a backing store for N-level caches L1-A1 and L1-A2 (i.e., where N equals 1, and i equals 1). In another example, processor 201a includes an (N+i)-level cache L3-A that is a backing store for N-level caches L1-A1, L1-A2, etc. (i.e., where N equals 1, and i equals 2). Processor 102/201a operates method 300 based on control logic, such as microcode 102c and/or circuit logic.

As shown, method 300 includes an act 301 of, during execution at a first processing unit, detecting an influx to an N-level cache. In some embodiments, act 301 comprises detecting an influx to a first N-level cache of plurality of N-level caches, the influx comprising data stored at a memory location. For example, based on activity by processing unit A1, such as a requested memory access to system memory 202 (e.g., resulting from normal or speculative execution of a first thread of application 104c), a cache miss may occur in cache L1-A1 (i.e., when N equals 1). As such, a line of cache L1-A1 obtains an influx of data, including the then-current value of requested memory location. Depending on cache attributes (e.g., what upper-level layers exist, whether the cache architecture is inclusive or exclusive, etc.) and current cache state, an influx could be sourced from system memory 202 or from a higher-level cache (e.g., L2-A1 and/or L3-A).

Method 300 also includes an act 302 of checking an (N+i)-level cache to determine if data of the influx has already been logged based on execution at a second processing unit. In some embodiments, act 302 comprises, based on detecting the influx to the first N-level cache, checking the (N+i)-level cache to determine if the data for the memory location has been previously logged on behalf of a second processing unit. For example, if i equals 1—such that the (N+i)-level cache comprises an (N+1)-level cache— then processor 201 may check an L2 cache, such as L2-A1 (which has knowledge of cache L1-A2 and processing unit A2). This check can be used to determine if the data for the memory location had previously been logged on behalf of processing unit A2. This data may have been previously logged, for example, based on prior execution of a second thread of application 104c at processing unit A2 that caused a cache miss in cache L1-A2. In an alternate example, if i equals 2—such that the (N+i)-level cache comprises an (N+2)-level cache—then processor 201 may check an L2 cache, such as cache L3-A (which has knowledge of all the other caches in processor 201). This check can be used to determine if the data for the memory location had previously been logged on behalf of any of processing units A2-A4 (e.g., based on prior execution of one or more other thread(s) of application 104c at one or more of processing units A2-A4 that caused cache miss(es) in caches L1-A2, L1-A3, and/or L1-A4). Note that in this second example, the L2 cache may be skipped in the check.

As shown, act 302 could be repeated any number of times, while incrementing the value of i each time. While i would typically be incremented by 1 each time, there could be embodiments that increment it by a positive integer that is greater than 1. The effect of repeating act 302 is while incrementing i is to check multiple upper-level caches. For example, if i=1, then when act 302 is initially run processor 201 may check an L2 cache layer (e.g., L2-A1 and/or L2-A2). If insufficient knowledge about the applicable memory location is found in the L2 cache, then processor 201 may repeat act 302 with i=2, thereby checking an L3 cache layer (e.g., L3-A). This could be continued for as many levels of caches as the computing environment provides. If i is ever incremented by a value greater than 1, then one or more cache layer(s) could be skipped along the way. It will be appreciated that it could be beneficial to check multiple cache levels in architectures that provide exclusive caches or that provide caches that exhibit hybrid inclusive/exclusive behaviors. This is because in these architectures there may be no guarantee that an outer cache layer contains a full superset of the data in the inner cache layer(s).

In view of the foregoing, it will be appreciated that method 300 can operate in environments, such as a processor 102 or 201a, in which i equals 1, such that the (N+i)-level cache comprises an (N+1)-level cache, and which the processor also comprises an (N+2)-level cache that is configured as a backing store for the (N+1)-level cache. In these environments, checking the (N+1)-level cache to determine if the data for the memory location has been previously logged on behalf of the second processing unit (i.e., act 302) can comprise determining that no cache line in the (N+1)-level cache corresponds to the memory location. Further, checking the (N+2)-level cache to determine if the data for the memory location has been previously logged on behalf of the second processing unit.

As shown, based on the outcome of act 302, method includes an act 303 of, when the data has already been logged, logging the influx by reference; or an act 304 of, when the data has not already been logged, logging the influx by value.

In some embodiments, act 303 comprises, when the data for the memory location has been previously logged on behalf of the second processing unit, causing the data for the memory location to be logged on behalf of the first processing unit by reference to log data that was previously logged on behalf of the second processing unit. Continuing the examples above, for instance, if a check of (N+1)-level cache L2-A1 and/or a check of (N+2)-level cache L3-A results in a determination that the data/memory location was already logged on behalf of processing unit A2 (based on an influx to cache L1-A2), then the processor 201a can cause the influx to cache L1-A1 to be logged on behalf of processing unit A1 by reference to the log entry made for processing unit A2. Examples of how logging by reference might be accomplished are given later.

Turning to the alternative outcome of act 302, in some embodiments, act 304 comprises, when the data for the memory location has not been previously logged on behalf of the second processing unit, causing the data for the memory location to be logged by value on behalf of the first processing unit. For example, if a check of (N+1)-level cache L2-A1 and/or a check of (N+2)-level cache L3-A results in a determination that the data/memory location has not already logged on behalf another processing unit, then the processor 201a can cause the influx to cache L1-A1 to be logged by value of behalf of processing unit A1. Logging by value can include, for example, logging the memory address and the memory value in a data packet for processing unit A1. Note that logging by value can include any number of compression techniques to reduce the number of bits needed to accomplish the actual logging.

As was described in connection with FIG. 1, processor(s) 102 can include buffer(s) 102e that can be used for temporarily storing trace data. Thus, in method 300, "causing" different types of data to be logged could comprise the processor 102 storing such data into the buffer(s) 102e. Additionally, or alternatively, it could include the processor 102 communicating such data to the tracer 104a, writing such data to the trace data store 104e, and/or notifying the tracer 104a that the data is available in the buffer(s) 102d. In some embodiments, the buffer(s) 102d could comprise one or more reserved portions of the cache(s) 102b. Thus, using buffers 102e, in acts 304/304 causing the data for the memory location to be logged—either by reference or by value—on behalf of the first processing unit can comprise delaying the logging based on availability of resources such as processor cycles, memory locations, bus bandwidth, etc. In embodiments in which the buffer(s) 102d comprise one or more reserved portions of the cache(s) 102b, the delayed logging could comprise invalidating a cache line (in the N-level cache and/or the (N+i)-level cache), rather than evicting it, in order to retain the data for the memory location for purposes of delayed logging.

The description of method 300 has referred to upper-layer caches having "knowledge" about lower-layer caches. The particular form of the "knowledge" that an upper-layer cache retains about lower-level caches can vary, and examples now follow.

In a basic form, this "knowledge" could be the mere presence of a cache line in an upper-level cache that corresponds to cache line(s) in lower-level cache(s) (i.e., cache lines corresponding to the same memory location and memory data). As mentioned above, in inclusive caches the upper layer(s) store a superset of the data in the layer(s) below them. For example, suppose the caches in FIG. 2A are inclusive. In this case, when activity by processing unit A2 causes a location from system memory 202 to be imported into cache L1-A2, that same memory location is also cached in caches L2-A1 and L3-A. If activity of processing unit A2 is being traced, embodiments may cause the memory location and its value to be logged on behalf of processing unit A2. Later, if activity by processing unit A1 causes that same location from system memory 202 to be imported into cache L1-A1, and that location still stores the same data, it is served from cache L2-A1, since cache L2-A1 already has the data. Prior techniques may again log this data for processing unit A1 based on it being an influx to cache L2-A1. However, embodiments herein may instead recognize that the memory location and its value already existed in cache L2-A1, and thus already existed in cache L1-A2. Because processing unit A2 is being logged, embodiments may recognize that the memory location and its value would have already been logged on behalf of processing unit A2, and therefore cause this new activity of processing unit A1 to be logged in reference to the log data previously recorded on behalf of processing unit A2.

Figure 4A:
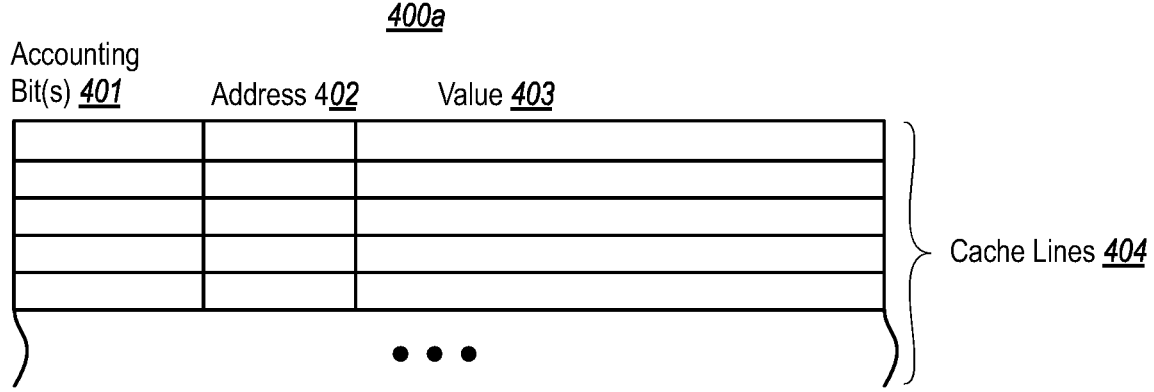
FIG. 4A illustrates an example shared cache, in which each cache line includes with one or more additional accounting bits.

More elaborate forms of "knowledge" by an upper-layer cache are also possible. For example, embodiments may extend the cache lines in one or more cache layers with additional "accounting" (or logging) bits that enable the processor 102 to identify, for each cache line that implements accounting bits, whether that cache line has been logged (potentially with the identity of processing unit(s) that logged the cache line). In order to understand these concepts, FIG. 4A illustrates an example shared cache 400a, similar to the shared cache 203 of FIG. 2B, in which each of cache line 404 includes one or more additional accounting bit(s) 401. Thus, each cache line 404 includes accounting bit(s) 401, conventional address bits 402, and value bits 403.

Figure 4B:
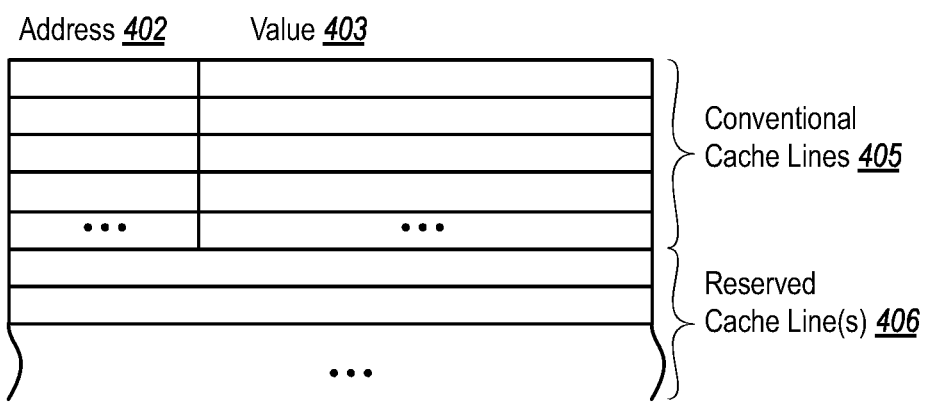
FIG. 4B illustrates an example of a shared cache that includes one or more reserved cache lines for storing accounting bits that apply to conventional cache lines.

Alternatively, FIG. 4B illustrates an example of a shared cache 400b that includes conventional cache lines 405 that store memory addresses 402 and values 403, as well as one or more reserved cache line(s) 406 for storing accounting bits that apply to the conventional cache lines 405. The bits of the reserved cache line(s) 406 are allocated into different groups of accounting bits that each corresponds to a different one of the conventional cache lines 405.

In a variation of the example FIG. 4B, the reserved cache line(s) 406 could be reserved as one (or more) ways in each index of a set-associative cache (which are discussed in more detail later). For example, in an 8-way set-associative cache one way in a set could be reserved for accounting bits that apply to the other seven ways in the set. This can decrease the complexity of implementing reserved cache lines and can speed access to the reserved cache lines since all ways in a given set are typically read in parallel by most processors.

Regardless of how the accounting bits are actually stored, each cache line's accounting bit(s) 401 could comprise one or more bits that function as a flag (i.e., on or off) used by the processor(s) 102 to indicate whether or not the present value in the cache line was logged on behalf of a processing unit (or, alternatively, consumed by a processing unit that participates in logging). Thus, the check in act 302 can include using this flag to determine if the cache line has been logged by a processing unit that participates in logging.

Alternately, each cache line's accounting bits 401 could comprise a plurality of bits. Pluralities of bits could be used in several ways. Using one approach, referred to herein as "unit bits," each cache line's accounting bits 401 can include a number of unit bits equal to a number of processing units 102a of the processor 102 (e.g., the number of logical processing units if the processor 102 supports hyper-threading or the number of physical processing unit if hyper-threading is not supported). These unit bits can be used by the processor 102 to track which one or more particular processing unit(s) have logged the cache line (if any). Thus, for example, a cache that is shared by two processing units 102a could associate two unit bits with each cache line.

In another approach to using pluralities of accounting bits 401, referred to herein as "index bits," each cache line's accounting bits 401 can include a number of index bits sufficient to represent an index to each of the processing units 102a of a processor 102 of computer system 101 that participate in logging, potentially along with a "reserved" value (e.g., −1). For example, if the processor 102 includes 128 processing units 102a, these processing units can be identified by an index value (e.g., 0-127) using only seven index bits per cache line. In some embodiments, one index value is reserved (e.g., "invalid") to indicate that no processor has logged a cache line. Thus, this would mean that the seven index bits would actually be able to represent 127 processing units 102a, plus the reserved value. For example, binary values 0000000-1111110 might correspond to index locations 0-126 (decimal), and binary value 1111111 (e.g., −1 or 127 decimal, depending on interpretation) might correspond to "invalid," to indicate that no processor has logged the corresponding cache line—though this notation could vary, depending on implementation. Thus, unit bits can be used by the processor 102 to indicate if the cache line has been logged (e.g., a value other than −1), and as an index to a particular processing unit that logged the cache line (e.g., the processing unit that most recently consumed it). This second approach to using pluralities of accounting bits 401 has the advantage of supporting a great number of processing units with little overhead in the cache 102b, with the disadvantage of less granularity than the first approach (i.e., only one processing unit is identified at a time).

In view of the foregoing, it will be appreciated that, in act 302, checking the (N+i)-level cache to determine if the data for the memory location has been previously logged on behalf of the second processing unit could comprise determining if a cache line in the (N+i)-level cache that corresponds to the memory location has one or more accounting bits set.

Another mechanism that can be used to determine whether a cache line has been logged is to utilize set-associative caches and way-locking. Since a processor's cache 102b is generally much smaller than system memory 103 (often by orders of magnitude), thus there are usually far more memory locations in the system memory 103 than there are lines in any given layer of the cache 102b. As such, some processors define mechanisms for mapping multiple memory locations of system memory to line(s) one or more cache layers. Processors generally employ one of two general techniques: direct mapping and associative (or set-associative) mapping. Using direct mapping, different memory locations in system memory 103 are mapped to just one line in a cache layer, such that each memory location can only be cached into a particular line in that layer.

Figure 5:
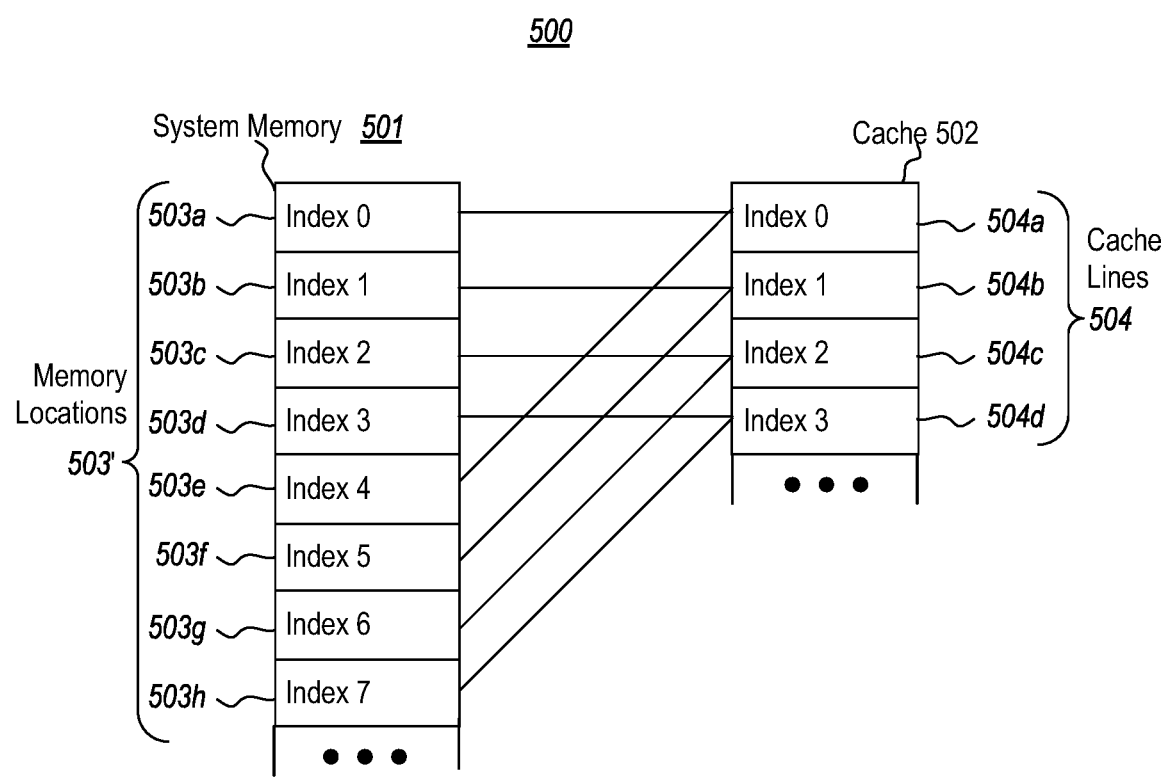
FIG. 5 illustrates an example of set-associative mapping between system memory and a cache.

Using set-associative mapping, on the other hand, different locations in system memory 103 can be cached to one of multiple lines in a cache layer. FIG. 5 illustrates an example 500 of set-associative mapping between system memory and a cache. Here, cache lines 504 of a cache layer 502 are logically partitioned into different sets of two cache lines each, including a first set of two cache lines 504a and 504b (identified as index 0), and a second set of two cache lines 504c and 504d (identified as index 1). Each cache line in a set is identified as a different "way," such that cache line 504a is identified by index 0, way 0, cache line 504b is identified by index 0, way 1, and so on. As further depicted, memory locations 503a, 503c, 503e, and 503g (memory indexes 0, 2, 4, and 6) are mapped to index 0. As such, each of these locations in system memory can be cached to any cache line within the set at index 0 (i.e., cache lines 504a and 504b). The particular patterns of the depicted mappings are for illustrative and conceptual purposes only, and should not be interpreted as the only way in which memory indexes can be mapped to cache lines.

Set-associative caches are generally referred to as being N-way set-associative caches, where N is the number of "ways" in each set. Thus, the cache 500 of FIG. 5 would be referred to as a 2-way set-associative cache. Processors commonly implement N-way caches where N is a power of two (e.g., 2, 4, 8, etc.), with N values of 4 and 8 being commonly chosen (though the embodiments herein are not limited to any particular N-values or subsets of N-values).

Notably, a 1-way set-associative cache is generally equivalent to a direct-mapped cache, since each set contains only one cache line. Additionally, if N equals the number of lines in the cache, it is referred to as a fully associative cache, since it comprises a single set containing all lines in the cache. In fully associative caches, any memory location can be cached to any line in the cache.

It is noted that FIG. 5 represents a simplified view of system memory and caches, in order to illustrate general principles. For example, while FIG. 5 maps individual memory locations to cache lines, it will be appreciated that each line in a cache may store data relating to multiple addressable locations in system memory. Thus, in FIG. 5, each location (503a-503h) in system memory (501) may actually represent a plurality of addressable memory locations. Additionally, mappings may be between actual physical addresses in the system memory 501 and lines in the cache 502, or may use an intermediary layer of virtual addresses.

Set-associative caches can be used for determining whether a cache line has been logged through use of way-locking. Way-locking locks or reserves one or more ways in a cache for some purpose. In particular, the embodiments herein utilize way-locking to reserve one or more ways for a processing unit that is being traced, such that the locked/reserved ways are used exclusively for storing cache misses relating to execution of that unit. Thus, referring back to FIG. 5, if "way 0" were locked for a traced processing unit, then cache lines 504a and 504c (i.e., index 0, way 0 and index 1, way 0) would be used exclusively for cache misses relating to execution of that unit, and the remaining cache lines would be used for all other cache misses. Thus, in order to determine whether a particular cache line has been logged, the processor 102 need only determine whether the cache line stored in an "N+1" cache layer is part of a way is has been reserved for a traced processing unit.

In view of the foregoing, it will be appreciated that, in act 302, checking the (N+i)-level cache to determine if the data for the memory location has been previously logged on behalf of the second processing unit could comprise determining if a cache line in the (N+i)-level cache that corresponds to the memory location is stored in a way that corresponds to a logged processing unit.

As was explained earlier, caches operate according to a CCP, which defines how consistency is maintained among various caches as the processing units read from and write to cache data, and how to ensure that the processing units always read valid data from a given location in a cache. As such, in connection with operating a cache, a processor 102 maintains and stores CCP state data. The granularity with which different processors and/or different CCPs track cache coherence state and make that cache coherence data available to a tracer 104a can vary. For example, at one end of the spectrum, some processors/CCPs track cache coherence per cache line as well as per processing unit. These processors/CCPs can, therefore, track the state of each cache line as it relates to each processing unit. This means that a single cache line can have information about its state as it relates to each processing unit 102a. Other processors/CCPs are less granular, and track cache coherence the level of the cache line only (and lack per-processing unit information). At the other end of the spectrum, processor manufacturers may choose to track cache coherence at the level of the cache line only for efficiency, since only one processor can own a line exclusively (exclusive, modified, etc.) at a time. As a mid-granularity example, a processor/CCP may track cache coherence per cache line, as well as an index (e.g., 0, 1, 2, 3 for a four-processing unit processor) to the processing unit that has the current cache line state.

Whatever the granularity with which CCP state data is maintained at a given processor, this CCP state data can be included in the "knowledge" that an (N+i)-level cache has about cached data. In particular, the CCP state data associated with a given cache line in an (N+i)-level cache can be used to determine if that cache line has been logged by one of the processing units. For example, if the CCP state data indicates that a particular processing unit has taken a given cache line as "shared," this data can, in turn, be used to determine that the processing unit has logged a read from the cache line. Thus, it will be appreciated that, in act 302, checking the (N+i)-level cache to determine if the data for the memory location has been previously logged on behalf of the second processing unit could comprise determining if a cache line in the (N+i)-level cache that corresponds to the memory location has associated CCP state data that is usable to determine that the cache line has been logged.

In act 303, an influx of data may be logged by reference to previously-logged data (typically data logged by a different processing unit that the one that caused the present influx). Logging by reference can be accomplished using one or more of a variety of methods (including combinations thereof), some of which are now described.

A first method logs by reference to a previously-logged memory address. For example, suppose processing unit A2 in FIG. 2A has logged data that represents a particular memory address (i.e., in system memory 202) and particular data stored at that memory address. Later, if that particular memory address/particular data is an influx for processing unit A1, processing unit A1 could store a log entry that identifies the (i) particular memory address and (ii) processing unit A2. Here, processing unit A1 has avoided re-logging the actual data stored at the memory address (which can be of considerable size). Some variants of this first method could also store ordering data, such as a MIN from a series that increments across the data streams for processing units A1 and A2. This MIN can later be used to order this is influx by processing unit A1 against one or more events at processing unit A2 (e.g., those that are also associated with a MIN from the same series). Accordingly, in act 303, causing the data for the memory location to be logged on behalf of the first processing unit by reference to log data that was previously logged on behalf of the second processing unit could comprise one or more of logging an address of the memory location, or logging an address of the memory location and ordering data, such as a MIN.

A second method logs by reference to a previous owner of a cache line storing the data. For example, suppose that processing unit A2 in FIG. 2A has logged a first influx of data. Suppose also that the first influx caused the data to be cached in a cache line of an (N+i)-level cache (e.g., cache L2-A1)—with processing unit A2 being identified an owner of the cache line. Later, if processing unit A1 causes a second influx of the same data, processing unit A1 could become the owner of this cache line in the (N+i)-level cache. Processing unit A1 could then store a log entry that identifies the prior owner of the cache line (i.e., processing unit A2) so that the A2's log entry can be used later to obtain the data. This means that logging by reference may involve recording the identity of a cache line along with a prior owner of a cache line (e.g., potentially avoiding recording memory addresses and memory values). Accordingly, in act 303, causing the data for the memory location to be logged on behalf of the first processing unit by reference to log data that was previously logged on behalf of the second processing unit could comprise logging the second processing unit as a previous owner of a cache line corresponding to the memory location.

A third method logs by reference to CCP data. For example, as mentioned, CCPs can store cache coherence state about each cache line as different processing units take it for reading and writing. The granularity of this data may vary depending on processor implementation, but could, for example, track the cache coherence state of each cache line as it relates to each processing unit, track the cache coherence state of each cache line along with an index (e.g., 0, 1, 2, 3, etc.) to the processing unit that owns the current cache line state, etc. The third method utilizes available CCP data to track which processing unit(s) previously owned cache coherence state for a cache line, which cache coherence state can then be used to identify which processing unit(s) has logged the value of a cache line. This means that logging by reference may involve recording CCP data for a cache line (e.g., again potentially avoiding recording memory addresses and memory values). Accordingly, in act 303, causing the data for the memory location to be logged on behalf of the first processing unit by reference to log data that was previously logged on behalf of the second processing unit could comprise logging CCP data referencing the second processing unit.

A fourth method logs by reference to cache way. As mentioned, set-associative caches can be used for determining whether a cache line has been logged through use of way-locking. For example, suppose way-locking is used to reserve one or more ways for processing unit P2, and that P2 logs a first influx of data. The first influx also results an (N+i)-level cache (e.g., cache L2-A1) storing data of the first influx in a cache line associated with that way. When another processing unit (e.g., P1) has a second influx of the same data, the presence of this cache line in the (N+i)-level cache indicates that P2 has already logged the data. Embodiments can log a reference to P2's log data based on noting the way in which the cache line is stored and can again potentially avoid logging memory addresses and memory values. This embodiment can also be used in connection with recording ordering information (e.g., MINs) to order events between P1 and P2. Accordingly, in act 303, causing the data for the memory location to be logged on behalf of the first processing unit by reference to log data that was previously logged on behalf of the second processing unit could comprise one or more logging a reference to a cache way, or logging a reference to a cache way and ordering data.

In addition to logging an influx for a first processing unit based on a prior influx by a second processing unit, embodiments also include optimizations for reducing (and even eliminating) logging when there are multiple influxes of the same data by a single processing unit. For example, referring to FIG. 2A, processing unit A1 could cause a cache miss in an N-level cache (e.g., the L1-A1 cache) for particular data at a memory location. In response, the cache hierarchy can import that data into the L1-A1 cache, and potentially also into an (N+i)-level cache (e.g., the L2-A1 cache and/or the L3-A cache). In addition, the influx can be logged by value for processing unit A1. Later, this data could be evicted from the L1-A1 cache. In typical cache environments, this could result in the data also being proactively evicted from the L2-A1 cache and/or the L3-A cache. However, rather than causing eviction(s) in the L2-A1 and/or L3-A caches, embodiments could instead retain the appropriate cache line(s) in one or more of these (N+i)-level caches. Accordingly, method 300 can comprise evicting a first cache line in the first N-level cache that corresponds to the memory location, while retaining a second cache line in the (N+i)-level cache that corresponds to the memory location.

Later, if processing unit A1 causes a subsequent cache miss in the L1-A1 cache for the same data, the retained cache line(s) in an (N+i)-level cache (e.g., the L2-A1 and/or L3-A caches) can be used to determine that this data was already logged on behalf of processing unit A1. Thus, in some embodiments, this subsequent cache miss is logged in reference to the prior log entry by processing unit A1. In other embodiments, a log entry could be omitted entirely for this subsequent cache miss—because processing unit A1 already has the data in its trace. Accordingly, method 300 can comprise, based on detecting a subsequent influx to the first N-level cache, the subsequent influx also comprising the data stored at the memory location, causing the subsequent influx to be logged by reference based on presence of the second cache line. Additionally, or alternatively, method 300 can comprise (i) detecting a subsequent influx to the first N-level cache based on additional code execution at the first processing unit, the subsequent influx also comprising the data stored at the memory location, and (ii) based at least on detecting the subsequent influx to the first N-level cache, and based at least on presence of the second cache line, determining that that the subsequent influx need not be logged.

It will be appreciated that this first embodiment of logging at a lower cache layer based on a processor checking one or more upper cache layers could be implemented as processor control logic (e.g., circuitry and/or microcode) that implements the method 300 of FIG. 3. As such, a processor 102 that implements this embodiment could include processor control logic that detects an influx to a lower-layer (e.g., L1) cache, and then (potentially progressively) checks one or more upper-layer caches to determine if the influx can be logged by reference, or even if the influx needs to be logged at all, as outlined in method 300.

Logging Cache Misses at a Lower Cache Layer Based on the Lower Cache Layer Sending Logging Request(s) to Upper Cache Layer(s)

In a second embodiment, a processor detects an influx (i.e., cache miss) to a lower-layer processor cache (e.g., L1) based on activity by a first processing unit (such as a read from a particular memory address), and that lower-layer processor cache then requests that an upper-layer cache log the influx and/or requests that the upper-layer cache inform the lower-layer how to log the influx. This upper-layer cache then determines if the influx needs to be logged and how (e.g., by value or by reference), and/or passes the request to yet another upper-layer cache (if it exists) if it lacks requisite knowledge to determine how to log the influx. This can continue to N cache levels.

A processor 102 implementing this second embodiment could potentially do so by implementing common (or at least very similar) control logic at all upper-layer cache(s), or at least all upper-layer cache(s) that participate in the logging process. In some implementations, the control logic needed to implement the second embodiment may be less extensive than the control logic needed to implement the first embodiment, while providing many (or all) of the same advantages that come from logging influxes at a lower cache level based on leveraging knowledge of upper cache level(s). Additionally, since cache levels already pass CCP messages between each other in most processors, the control logic needed to implement the second embodiment may potentially be implemented as extensions to existing control logic.

Figure 6:
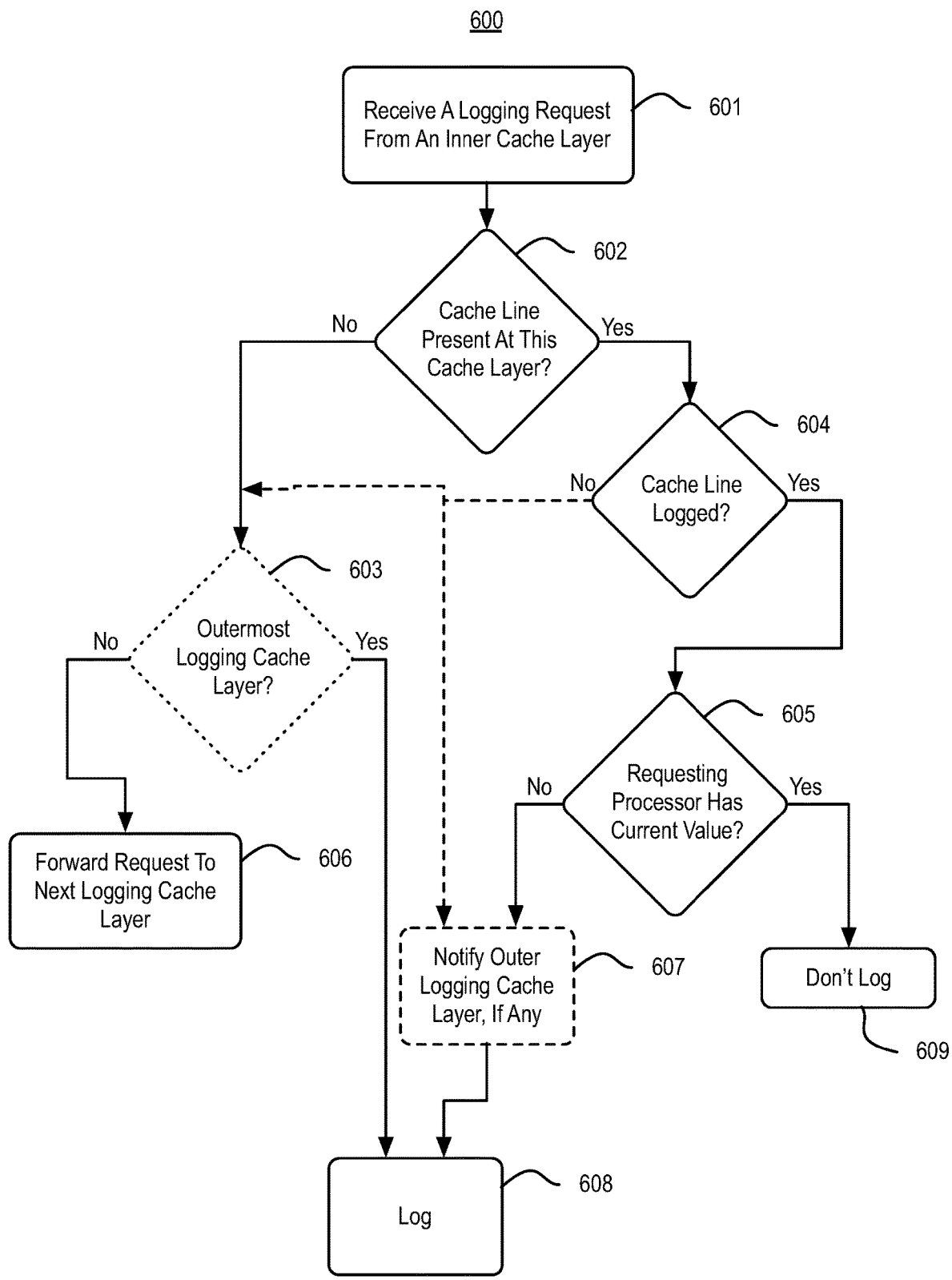
FIG. 6 illustrates a flowchart of an example method of an upper cache layer determining how to log an influx by a lower cache layer, based on a logging request by the lower cache layer.

In accordance with this second embodiment, FIG. 6 illustrates a flowchart of an example method 600 of an upper cache layer determining how to log in influx by a lower cache layer, based on a logging request by the lower cache layer. Similar to method 300, method 600 may be implemented in microprocessor environments, such as the example environment of FIG. 2A, which depicts a processor 201a that includes a plurality of processing units (e.g., two or more of processing units A1-A4), and that includes a plurality of caches arranged into a plurality of cache layers. These caches can include a plurality of first caches (e.g., two or more of caches L1-A1 to L1-A4) within a first cache layer, and one or more second caches (e.g., one or more of caches L2-A1 or L2-A2, or cache L3A) within a second cache layer. These caches can include a particular second cache in the second cache layer (e.g., L2-A1 or L3-A) serving as a backing store at least a particular first cache in the first cache layer (e.g., L1-A1). For simplicity, method 600 will refer to the particular first cache as a "first cache" and the particular second cache as a "second cache." The microprocessor environment can include control logic (e.g., microcode 102c and/or circuitry) for performing the method. In some embodiments, such control logic is implemented at one or more upper cache layers (e.g., cache layers L2 and/or L3 in FIG. 2A).

Method 600 is performed at the second cache introduced above, which participates in logging, and begins at act 601, where the second cache receives a logging request from an inner cache layer. In some embodiments, act 601 could comprise the second cache receiving, from the first cache, a logging request referencing a particular memory address. For example, cache L2-A1 in the L2 cache layer (or cache L3-A, if method 600 is being performed at the L3 cache layer) could receive a logging request from cache L1-A1 in the L1 cache layer. This logging request could be based on activity by processing unit A1, such as a read to the particular memory address (e.g., in system memory 202), which causes an influx of data to the first cache L1-A1. In the environment of FIG. 2A, the data in this influx could be served from cache L2-A2, cache L3-A, or system memory 202.

Based on this request, method 600 proceeds to act 602, in which the second cache determines if a cache line for the memory address is present at this cache layer. In some embodiments, act 602 could comprise, based on the request, determining whether a cache line corresponding to the memory address is present in the second cache. For example, based on receiving the request, cache L2-A1 in the L2 cache layer (or cache L3-A, if method 600 is being performed at the L3 cache layer), could determine if it contains a cache line that caches the particular memory address from the logging request. While such a cache line would typically be present if the cache hierarchy includes inclusive caches (e.g., where the second cache stores a superset of the data in the cache(s) below it in the first cache layer), it will be appreciated that this may not be the case if the cache hierarchy is exclusive or exhibits some exclusive behaviors.

Following the "no" branch from act 602 (i.e., when the cache line is not present in the particular second cache), method 600 reaches act 603 where the second cache could determine if it is the outermost logging cache layer. As will be discussed, based on the outcome of act 603, method 600 could include the second cache either (i) causing the cache line to be logged when there does not exist a third cache (e.g., within a third cache layer) that participates in logging and that serves as a backing store for at least the second cache (i.e., following the path to act 608), or (ii) forwarding the request to the third cache when the third cache does exist (i.e., following the path to act 606).

For example, if the second cache is cache L2-A1, at act 603 the second cache could determine if cache L3-A exists and is a participant in logging (and thus L2-A1 is not the outermost logging cache layer). If cache L3-A does exist, it will be appreciated that, in some implementations, this cache could participate in logging at one moment, and not participate in logging at another moment, depending on a current configuration of the processor. In another example, if the second cache is cache L3-A, at act 603 the second cache could determine that no outer cache layer exists, and thus that it is the outermost logging cache layer. Note that there could be intervening non-logging cache layers between logging cache layers. For example, if act 603 is being performed by cache L2-A1, and some L4 cache layer were to exist, the L3 cache layer may be non-logging and the L4 cache layer may be logging.

If the decision from act 603 is that the second cache is not the outer logging cache layer (i.e., the "no" branch from act 603) then method 600 proceeds to act 606 where the second cache forwards the logging request to the next logging cache layer. Method 600 is then repeated at a cache in that layer. For example, if the second cache is cache L2-A1, it could forward the request to cache L3-A, and cache L3-A could repeat method 600. This can be extended to as many logging cache levels exist. In some implementations, when act 606 is reached, rather than forwarding the logging request to the next logging cache layer, the second cache layer might send one or more reply messages to the first cache instructing it to send its logging request to the next logging cache layer directly.

On the other hand, if the decision from act 603 is that the second cache is the outermost logging cache layer (i.e., the "yes" branch from act 603) then method 600 proceeds to act 608 where the second cache causes the influx to be logged. As will be discussed later, logging at act 608 could be performed by value or by reference (depending on the particular situation), and the actual logging at act 608 could be performed at the current cache layer, and/or at a lower cache layer.

Note that, as indicated by the broken lines in the decision block of act 603, act 603 might be an optional act depending on the computing environment in which method 600 is performed. For example, if the cache hierarchy includes only one upper cache layer that participates in logging (and which performs method 600), then this cache layer will always be the "outermost" logging cache layer. In these environments, act 603 may not be necessary. Additionally, even when there are multiple logging cache layers, the outermost logging cache layer may have inherent knowledge that it is the outermost layer. In either of cases, a "no" decision at act 602 may therefore simply proceed to act 608.

Returning to act 602, and following the "yes" branch (i.e., when the cache line is present in the second cache), method 600 reaches act 604 where the second cache determines if the cache line is logged. This determination could include determining whether the cache line was logged by the second cache, or whether the cache line was logged by some other cache and the second cache is aware of that logging. The manner of the second cache determining the cache line has been logged (and potentially by which processing unit(s)) can rely on any of the mechanisms described in connection with the first cache logging embodiment (e.g., including, for example, the embodiments described in connection with FIGS. 4A, 4B, and 5). For example, the second cache could store accounting bits (i.e., flag bits, unit bits, and/or index bits) as described in connection with FIGS. 4A and 4B, the second cache could utilize way-locking as described in connection with FIG. 5, and/or the second cache could store and rely on CCP data.

As will be discussed, if the cache line is not determined by the second cache to be logged, method 600 could include the second cache forwarding the request to the next logging cache layer (i.e., following the path to act 606) and/or logging the cache line (i.e., following the path to act 608). If, on the other hand, the cache line is determined by the second cache to be logged, method 600 could include the second cache causing the cache line to be logged when the second cache has not determined whether the first cache is aware of a current value stored in the cache line of this cache (i.e., following the path to act 608), or the second cache determining that cache line need not be logged when it is determined that the requesting processor is aware of the current value stored in the cache line of the second cache (i.e., following the path to act 609).

For example, if the decision from act 604 is that cache line is not determined by the second cache to be logged (i.e., the "no" branch from act 604), the second cache could cause the influx to be logged at act 608, while potentially notifying an outer logging cache layer, if any, of the logging that occurs (i.e., act 607). If act 607 is performed, then causing the cache line to be logged when it is not determined by the particular second cache to be logged in act 608 could comprise determining that the third cache layer exists, and notifying the third cache that the cache line has been logged by value by the particular second cache. Note that, in method 600, acts 607 and 608 could be performed in any order with respect to each other, including the acts being performed in parallel. Note that act 607 could cause method 600 to be performed at the next logging cache layer.

Alternatively, FIG. 6 shows that, if the decision from act 604 is that cache line is not determined by the second cache to be logged, the second cache could determine if it is the outermost logging cache layer at act 603 and, based on the outcome, either forward the request to the next logging cache layer at act 606 or log the influx at act 608. Essentially, these alternate paths communicate that if there is a "no" decision at act 604, the second cache can (i) log the influx and notify the next logging cache layer if there is one (i.e., so that the next layer is aware of the logging event for later use), and/or (ii) forward the request to the next logging cache layer since it (or even a yet higher layer) might contain knowledge that could lead to the influx being logged by reference or not logged at all.

Returning to act 604, if the second cache is aware of the cache line being logged (i.e., the "yes" branch from act 604), then at act 605 the second cache determines if the processing unit that caused the logging request has the current value in the cache line. It will be appreciated that the second cache could have a more up-to-date value for the requested memory address than the first cache currently possesses. For example, if the first cache is cache L1-A1 and the second cache is cache L2-A1, it could be that cache L2-A2 has a more recent value for the particular memory address than L1-A1 had at the time that processing unit A1 performed the read that resulted in the logging request in act 601 (e.g., due to activity by processing unit A2). If it is known for certain that the first cache has the current value in the cache line at the second cache (i.e., the "yes" branch from act 605), then the second cache could choose to not log anything at act 609 (i.e., because the current value has already been logged). If, on the other hand, it is not known for certain that the first cache has the current value in the cache line at the second cache (i.e., the "no" branch from act 605), then the second cache can cause the influx to be logged at act 608, while potentially notifying an outer logging cache layer, if any, of the logging that occurs (i.e., act 607). Again, acts 607 and 608 could be performed in any order with respect to each other, including the acts being performed in parallel.

As was mentioned, logging of an influx at act 608 could be performed by value or by reference, depending on the particular situation. In general, an influx is logged by value if the value of the influx cannot be located based on the trace (e.g., either by processor activity during replay or by prior logged cache lines). The influx might be able to be logged by reference if the value of the influx can be obtained by replaying logged processor activity or if the value of the influx is stored in a prior logged cache line. Notably, even in situations in which it might be legal to log an influx by reference, it is still legal to log that influx by value. A decision may be made to log by value, for example, to save processing time during tracing, to create a trace that is more easily replayed, etc. Thus, it will be appreciated that act 608 could comprise causing a cache line to be logged based on logging a value of the particular memory address directly, and/or logging a reference to a prior log entry for the particular memory address.

One situation in which logging might be able to be performed by reference in method 600 is if act 608 has been reached via act 605 (i.e., the second cache knows the value is logged, but requesting processor is not known for certain to have the current value). Here, logging at act 608 could be performed for the first cache in reference to the value already known to be logged by the second cache. For example, cache L1-A2 might have logged the current value, and cache L2-A1 is aware of this, so the influx can be logged for cache L1-A1 in reference to the logging by L1-A2.

In these cases, it may also make sense to not log anything if the replay code can recover the value through other means. For example, the current influx caused by processing unit A1 may have already been logged in connection with prior activity by processing unit A2, so it would be possible at act 608 to log the current influx by reference to A2's log. However, a trace might still be correct if method 600 refrains from logging anything for A1 at this time. This decreases trace size, with the tradeoff of needing to locate this prior logged value in the traces of other processing units during replay.

The task of locating the prior logged value during replay is dependent on being able to reproduce at least a partial ordering of events among the different logged processing units. There are several things that could be included in a trace to assist in locating a prior logged value. For example, logging cache evictions help in determining, at replay, that the value needed to fulfill a read by A1 is not available in cache A1-L1 (i.e., because it was evicted). Thus, the value can then be searched for in the trace(s) for other processing unit(s). In another example, logging CCP data can also help determine that the value needed to fulfill a read by A1 is either not available or not current in cache A1-L1 during replay. Thus, the value can then be searched for in the trace(s) for other processing unit(s). Note that CCP data could potentially indicate where to look for the current value. In another example, knowledge of the geometry of the cache can help locate a needed log entry. For example, it may be known that processing units A1 and A2 share the same L2 cache (i.e., L2-A1). As such, it would make sense to search the A2's trace for the needed log entry first, e.g., as opposed to searching the traces for A3 and A4.

Another situation in which logging might be able to be performed by reference is if act 608 has been reached when method 600 is being performed at a current cache layer based on a lower cache layer sending notice to the current cache layer at act 607. Here, the lower cache layer would have logged the influx (either by value or by reference), so the current cache layer can log in reference to the lower cache layer's logs.

As was also mentioned, logging at act 608 could be performed at the current cache layer, or at a lower cache layer. For example, in some implementations, rather than the second cache layer performing the logging itself when it reaches act 608, it could instead send one or more reply messages back down to the first cache instructing the first cache that the influx should be logged, and how (i.e., by value or by reference, and if by reference then where the reference log entry is). The reply message(s) could also instruct the first cache how to set accounting bits, save CCP data, etc. Similarly, at act 609, the second cache layer could send a reply message to the first cache layer to inform it that no logging is necessary. If the original logging request had propagated through more than one logging cache layers, these reply messages might be propagated back down through the layers, or might be sent to the original requestor directly. In view of the foregoing, it will be appreciated that act 608 could comprise causing a cache line to be logged based on instructing the first cache to log a value of the particular memory address directly, or instructing the first cache to log a reference to a prior log entry for the particular memory address.

Regardless of how logging is performed, act 608 can include the second cache layer setting any appropriate logging accounting bits (e.g., flag bits, unit bits, or index bits), or saving any appropriate CCP messages, in order to document the fact that the influx was logged. As such, it will be appreciated that, in act 608, causing a cache line to be logged could comprise marking the cache line as being logged within the particular second cache (e.g., by setting accounting bits associated with the cache line as appropriate).

In some embodiments, logging at act 608 could include the second cache proactively notifying one or more lower cache layers that it has a cache line logged, and possibly how it has the cache line logged. For example, if cache L2-A1 has logged at act 608, it could one or more messages to one or more of caches L1-A2 to L1-A4 (i.e., L1 caches other than the one that initiate the logging request) to notify them that it has the cache line logged. This information might include whether cache L2-A1 has logged the cache line by value or by reference. If the cache line is logged by reference, cache L2-A1 might even send information about where the original log data exists. In response, the caches (e.g., one or more of L1-A2 to L1-A4) can store information recording the fact the cache L2-A1 has the cache line logged, including potentially how cache L2-A1 has the cache line logged. This information could be stored, for example, in additional accounting bits within these L1 caches. This way, if one of these L1 caches later determine that they need to log the cache line they can know up front that it has already been logged and avoid sending a logging request to an upper-layer cache or sending a question of how to log to an upper-layer cache.

Notably, any of the techniques discussed above in connection with the first embodiment, for use of buffer(s) 102(*e*) and/or a devoted portion of the cache(s) 102*b* to accomplish delayed logging are also applicable to this second embodiment. As such, it will be appreciated that, in act 608, causing a cache line to be logged could comprise logging the cache line within a trace buffer, such as buffer(s) 102*e* and/or a portion of the cache(s) 102*b*.

Figure 7:
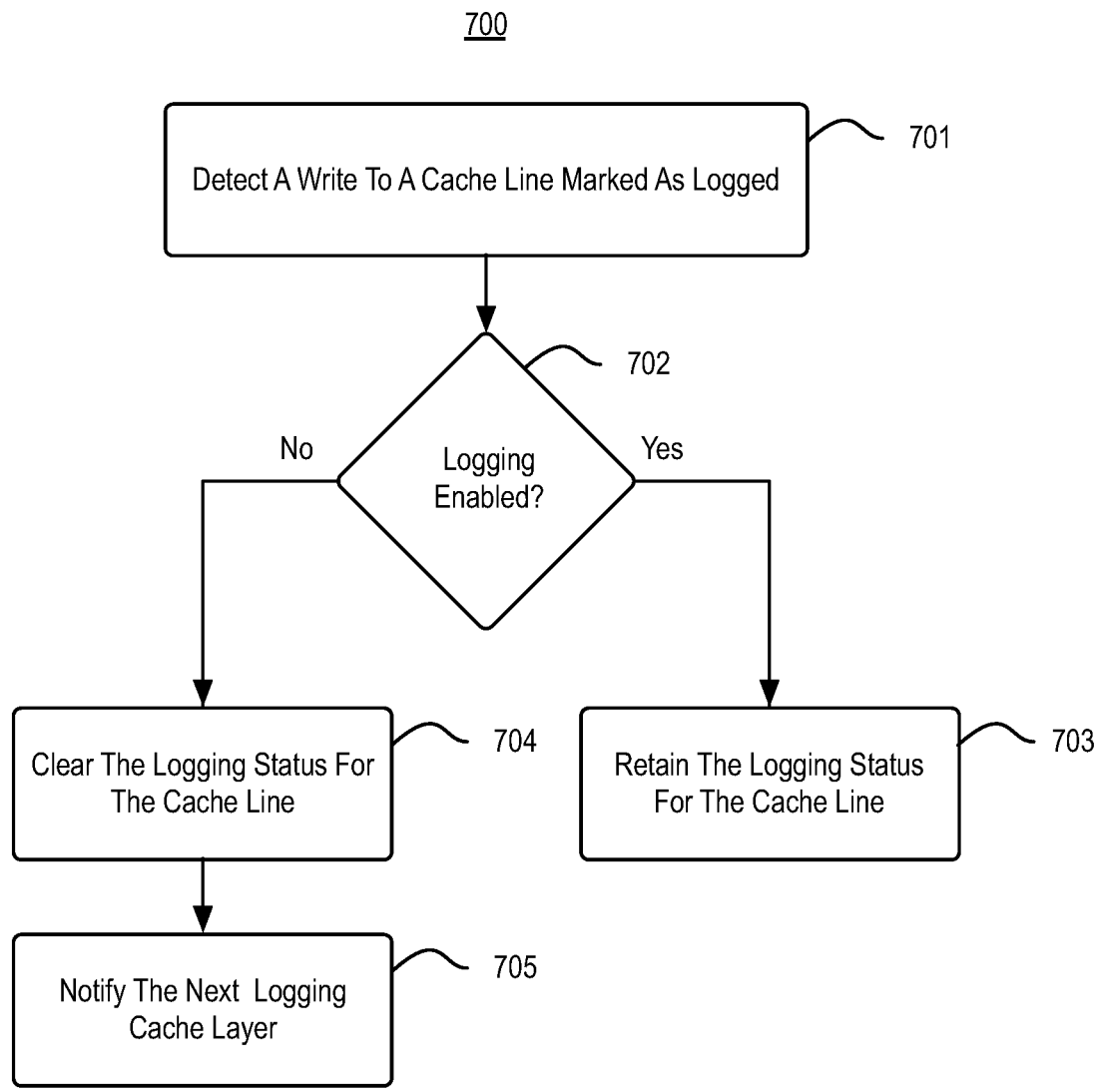
FIG. 7 illustrates a flowchart of an example method for managing a cache line's logging status when a processing unit transitions between having logging enabled to having logging disabled.
Figure 8:
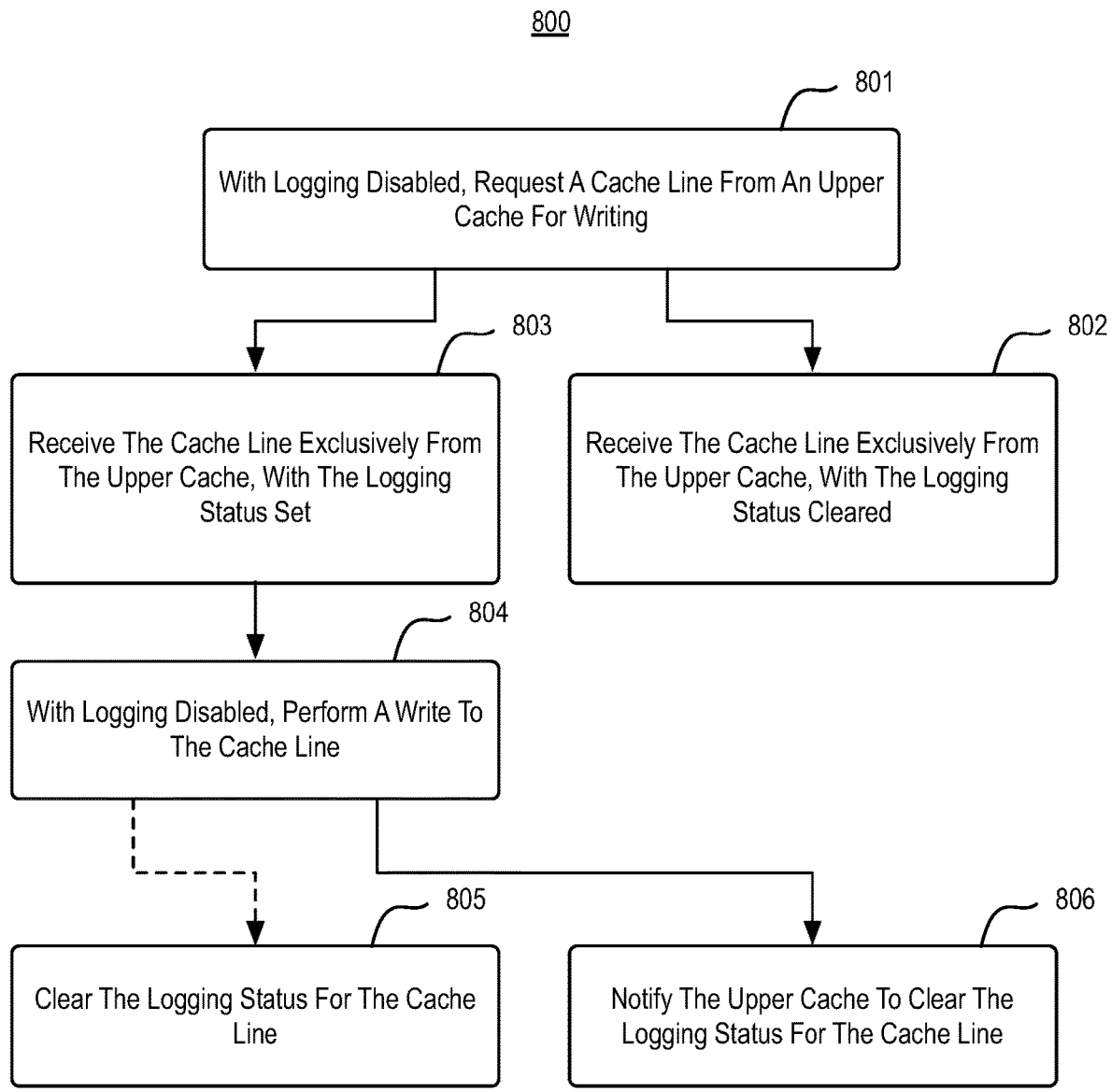
FIG. 8 illustrates a flowchart of an example method for managing a cache line's logging status when a processing unit with logging disabled receives a cache line exclusively from a parent cache for writing.
Figure 9:
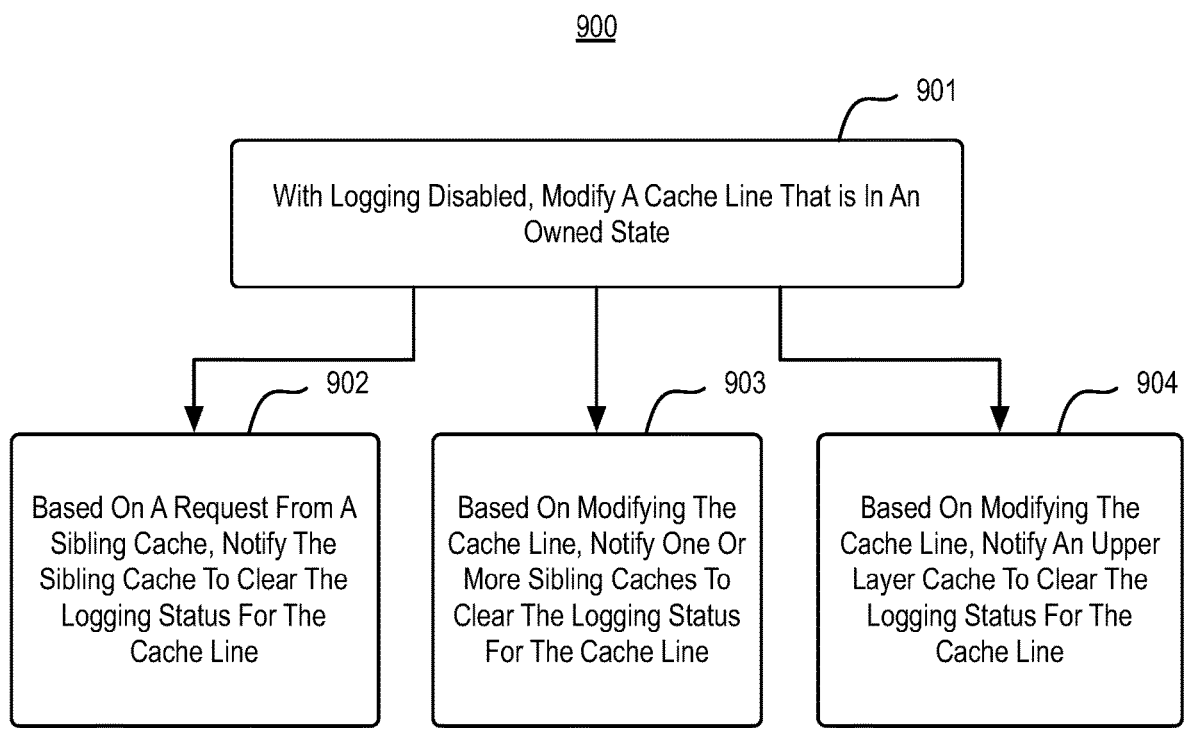
FIG. 9 illustrates a flowchart of an example method for managing a cache line's logging status when a processing unit writes to a cache line that the processing unit has taken in an "owned" cache coherence protocol state.

While method 600 have focused on actions performed at an upper logging cache layers, FIGS. 7-9 show some example methodologies that could be performed at a lower cache layers (e.g., L1 cache layer(s) that initiated the original logging requests). In particular, while method 600 focused on performing logging, including setting logging status of a cache line to indicate that the value of the cache line has been logged (e.g., setting accounting bits that are associated with the cache line, storing CCP data, etc.), these methodologies relate to later clearing that logging status when the value of this cache line is no longer logged.

A cache may contain a cache line that has its logging status is set because a processing unit using that cache performed a memory read while logging was enabled for that processing unit. A cache might also receive a cache line from an upper-level cache with the logging status already set on the cache line. As mentioned above, a cache line may also have logging status set because a higher-level cache has proactively notified it that a cache line has been logged. A cache line's logging status is generally cleared when a processing unit performs a write to the cache line while logging is disabled for that processing unit.

Initially, FIG. 7 illustrates a flowchart of an example method 700 for managing a cache line's logging status when the processing unit transitions between having logging enabled to having logging disabled. Like method 600, method 700 may be implemented in microprocessor environments, such as the example environment of FIG. 2A. In general, method 700 operates after a processing unit (e.g., A1) has been operating with logging enabled, and it uses a cache (e.g., L1-A1) that now includes one or more cache lines that have been logged. If the processing unit writes to one of these logged cache lines, method 700 retains or clears this logging status depending on whether logging is presently enabled or disabled for the processing unit.

Method 700 begins at act 701 where it detects a write to a cache line marked as logged. In some embodiments, act 701 could comprise detecting a write to a cache line in a first cache that has a logging status that has been set. For example, the first cache could be cache L1-A1. This cache could have a cache line that was previously marked at logged (e.g., by having its accounting bits set as appropriate) based on a memory read by processing unit A1. For example, this cache line could correspond to the particular memory address that was discussed above in connection with method 600.

Next, method 700 includes act 702, where it is determined if logging is enabled. In this context, act 702 demines if a processing unit associated with the first cache has logging enabled. In some embodiments, act 702 could comprise, based on detecting the write, determining whether logging is enabled for the particular processing unit. For example, control logic for cache L1-A1 could determine if processing unit A1 has logging enabled. If logging is enabled (i.e., the "yes" branch from act 702), then the logging status for the cache line can be retained at act 703. Thus, in some embodiments, act 703 could comprise, based at least on logging being enabled for the particular processing unit, retaining the logging status for the cache line.

Alternatively, if logging is disabled (i.e., the "no" branch from act 702), then the logging status for the cache line can be cleared at act 704. Thus, in some embodiments, act could comprise, based at least on logging being disabled for the particular processing unit, clearing the logging status for the cache line. For example, cache L1-A1 could clear the cache line's accounting bits, as appropriate.

As shown, in addition to clearing the logging status, method 700 includes notifying the next logging cache layer. In some embodiments, act 705 could comprise, based at least on logging being disabled for the particular processing unit, notifying at least one of one or more second caches that its logging status for the cache line should be cleared. For example, one of the second caches could be cache L2-A1, and as such cache L1-A1 could notify cache L2-A1 to clear the logging status for its copy of the cache line. It is noted that acts 704 and 705 could be performed in any order with respect to each other, including being performed in parallel.

Although not depicted in FIG. 6, method 600 could, correspondingly, include the particular second cache receiving a message from the first cache indicating that another cache line in the first cache that also corresponds to the memory address is marked as not logged within the first cache, method 600 could also include, based on the message, marking the cache line as not logged within the particular second cache.

FIG. 8 illustrates a flowchart of an example method 800 for managing a cache line's logging status when a processing unit with logging disabled receives a cache line exclusively from a parent cache for writing. Like method 600 and 700, method 800 may be implemented in microprocessor environments, such as the example environment of FIG. 2A. In general, method 800 operates when a processing unit (e.g., A1) is operating with logging enabled, and it uses a cache (e.g., L1-A1) whose parent cache(s) (e.g., L2-A1 and/or L3-A) contains cache lines whose logging status has been set, and the cache takes a cache line for writing from a parent cache.

Method 800 begins at act 801, where, with logging disabled, a cache requests a cache line from an upper cache for writing. For example, based on a request from processing unit A1 write to a particular memory address, a cache miss could occur in cache L1-A1. As a result, cache L1-A1 could request a copy of an appropriate cache line from cache L2-A1 or cache L3-A.

In some situations, cache L1-A1 could receive the cache line with the logging status cleared. As such, method 800 can include act 802, where the cache receives the cache line exclusively from the upper cache, with the logging status cleared. The logging status could be cleared in the received cache line, for example, because (i) it was not set in the upper cache, or (ii) the upper cache is aware that logging is disabled at processing unit A1 and thus the upper cache cleared the logging status when serving the cache line to cache L1-A1. For example, method 600 could include receiving a message from the first cache requesting the cache line for writing, and sending the cache line to the first cache, the cache line being marked as not logged based at least on logging being disabled for the first cache.

In other situations, cache L1-A1 could receive the cache line with the logging status set. As such, method 800 can include act 803, where the cache receives the cache line exclusively from the upper cache, with the logging status set. The logging status could be set in the received cache line, for example, because it was set in the upper cache.

Next, method 800 can include act 804 where, with logging still disabled, the cache performs a write to the cache line. For example, cache L1-A1 can complete the original write request from processing unit A1 by writing the appropriate value to the cache line. Next, method 800 can include act 805 where the logging status for the cache line is cleared, and act 806 where the upper cache is notified to clear its logging status for the cache line. While act 805 is depicted separately from act 804, it is noted that clearing the logging status for the cache line could be a natural part of performing the write at act 804. For example, with logging disabled, any write could result in the logging status being cleared for the cache line that was written to. As such, the arrow between acts 804 and 805 is shown in with a broken line, to indicate that act 804 could actually be optional. Act 806 could operate in a similar manner to act 705 discussed above in connection with method 700.

Similar to act 705 of method 700, when act 806 is performed method 600 could, correspondingly, include the particular second cache receiving a message from the first cache indicating that another cache line in the first cache that also corresponds to the memory address is marked as not logged within the first cache, method 600 could also include, based on the message, marking the cache line as not logged within the particular second cache.

FIG. 9 illustrates a flowchart of an example method 900 for managing a cache line's logging status when a processing unit writes to a cache line that the processing unit has taken in an "owned" CCP state. Like methods 600-800, method 900 may be implemented in microprocessor environments, such as the example environment of FIG. 2A. In general, method 900 operates when a CCP provides for a state in which, during a period in which one processing unit has taken a cache line for writing, other processing unit(s) can request the current value of the cache line. An example of this is the "owned" state in the MOESI CCP that was introduced earlier.

Method 900 begins at act 901 where, with logging disabled, a cache modifies a cache line that is in an owned state. For example, processing unit A1 may have taken a cache line as "owned" in cache L1-A1. During this time, processing unit A1 may perform a write to that cache line. As discussed in connection with FIG. 8, clearing the logging status for the cache line could be a natural part of performing a write when logging is disabled. A such, method 900 does not depict any express act for clearing a logging status, though a express act could exist in some implementations.

Based on act 901, method 900 shows that one (or more) actions can be taken to communicate that the logging status for the cache line should also be cleared on other cache(s). In act 902, based on a request, the cache notifies a sibling cache to clear the logging status for the cache line. For example, after a write has been performed to the owned cache line in cache L1-A1, cache L1-A1 could receive a request (e.g., a CCP message) from a sibling cache, such as cache L2-A2, requesting the current value of the cache line. As a result of this request, cache L1-A1 can notify cache L2-A2 that it should clear the logging status in its corresponding cache line, if it is set. This notice could be sent along with a CCP message communicating the present value of the cache line in cache L1-A1, or as part of a separate message.

In act 903, based on modifying the cache line, the cache notifies one or more sibling caches to clear the logging status for the cache line. For example, after a write has been performed to the owned cache line in cache L1-A1, cache L1-A1 could broadcast a notification to its sibling caches (e.g., L1-A2 to L1A4) to let them know that they should clear the logging status for that cache line (if the cache line is present in those caches and if the logging status is set). Thus, whereas act 902 relatively notifies sibling caches to clear logging status, act 903 proactively notifies sibling caches.

In act 904, based on modifying the cache line, the cache notifies an upper cache layer to clear the logging status for the cache line. For example, after a write has been performed to the owned cache line in cache L1-A1, cache L1-A1 could broadcast a notification to its parent cache(s) such as cache L2-A1 and/or L3-A to let them know that they should clear the logging status for that cache line (if the cache line is present in those caches and if the logging status is set). Thus, similar to act 903, act 904 performs a proactive notification, but this time to parent cache(s), rather than sibling cache(s).

Notably, some implementations could perform more than one of acts 902-904. For example, an implementation could proactively notify upper cache(s) when the write is performed (i.e., act 904), but only reactively notify sibling cache(s) (i.e., act 902). In another example, an implementation could proactively notify both upper cache(s) (i.e., act 904) and sibling cache(s) (i.e., act 903).

Additionally, similar to acts 705 of method 700 and act 806 of method 800, when 903 is performed method 600 could, correspondingly, include the particular second cache receiving a message from the first cache indicating that another cache line in the first cache that also corresponds to the memory address is marked as not logged within the first cache, method 600 could also include, based on the message, marking the cache line as not logged within the particular second cache.

Logging influxes to lower layer (e.g., L1) caches based on knowledge of upper layer (e.g., L2, L3, etc.) cache(s) can provide several advantages beyond just enabling logging by reference and refraining from logging in some instances. For example, a lower layer and initiate the logging process only when data from a cache miss has actually been consumed by a processing unit. This can avoid, for example, logging cache misses resulting from speculative execution. In addition, a lower layer can perform logging contemporaneously with retiring of an instruction that caused the cache activity. This can result in a trace that captures a higher precision of timing. Finally, when logging a lower layer, logging could be based on virtual memory addressing, rather than physical memory addressing, if desired. Notably, if logging based on virtual memory addressing, there could be situations in which a plurality of virtual addresses map to the same physical address. In these situations, a cache might not cause an access to the same physical address through a different virtual address to behave as a cache miss. If this happens, that tracer 104a may log data from the TLB 102f. In some implementations, a virtual or physical address may further be distinguished by additional identifiers (e.g., a virtual processor ID, a security setting for the memory address, etc.). In at least some of those implementations, a cache might cause an access to a same address with different additional identifier (or with a higher, lower, or different security level) to behave as a cache miss.

Accordingly, the embodiments herein provide different embodiments for recording bit-accurate "time travel" trace recordings based on tracing the effects of execution across a plurality of processing units using at least two tiers or layers of processor caches. Recording trace files in these manners may need only modest processor modifications and, when compared to prior trace recording approaches, it can reduce by several orders of magnitude both the performance impact of trace recording as well as trace file size.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A microprocessor, comprising:
a plurality of processing units;
a plurality of caches arranged into a plurality of cache layers, the plurality of caches including a plurality of first caches within a first cache layer and one or more second caches within a second cache layer, a particular second cache in the second cache layer serving as a backing store for at least a particular first cache in the first cache layer; and
control logic that configures at least the particular second cache to perform at least the following:
receive, from the particular first cache, a logging request referencing a particular memory address; and
based on the request, determine whether a cache line corresponding to the memory address is present in the particular second cache, and
when the cache line is not present in the particular second cache, perform one of:
cause the cache line to be logged when there does not exist a third cache that participates in logging and that serves as a backing store for at least the particular second cache, or
forward the request to the third cache when the third cache does exist; or
when the cache line is present in the particular second cache, perform at least one of:
cause the cache line to be logged when the cache line is (i) not determined by the particular second cache to be logged, or (ii) determined by the particular second cache to be logged but the particular second cache has not determined that the first cache is aware of a current value stored in the cache line of the particular second cache; or
determine that cache line need not be logged when (i) the cache line is determined by the particular second cache to be logged, and (ii) it is determined that the first cache is aware of the current value stored in the cache line of the particular second cache.

2. The microprocessor as recited in claim 1, wherein causing the cache line to be logged comprises:
logging the cache line within a trace buffer; and
marking the cache line as being logged within the particular second cache.

3. The microprocessor as recited in claim 1, wherein causing the cache line to be logged comprises one of:
instructing the first cache to log a value of the particular memory address directly; or
instructing the first cache to log a reference to a prior log entry for the particular memory address.

4. The microprocessor as recited in claim 1, wherein causing the cache line to be logged when the cache line is not determined by the particular second cache to be logged comprises:
determining that the third cache layer exists, and
notifying the third cache that the cache line has been logged by value by the particular second cache.

5. The microprocessor as recited in claim 1, wherein the first cache layer comprises an L1 cache layer, and wherein the second cache layer comprises an L2 cache layer or an L3 cache layer.

6. The microprocessor as recited in claim 1, the control logic also configuring at least the particular second cache to:

receive a message from the first cache indicating that another cache line in the first cache that also corresponds to the memory address is marked as not logged within the first cache; and
based on the message, mark the cache line as not logged within the particular second cache.

7. The microprocessor as recited in claim 6, wherein the other cache line is marked as not logged within the first cache based on the other cache line being written to by a processing unit corresponding to the first cache while logging is disabled for the processing unit.

8. The microprocessor as recited in claim 1, the control logic also configuring at least the particular second cache to:
receive a message from the first cache requesting the cache line for writing; and
send the cache line to the first cache, the cache line being marked as not logged based at least on logging being disabled for the first cache.

9. A method of an upper cache layer determining how to log an influx by a lower cache layer, based on a logging request by the lower cache layer, the method being implemented at a computing device that includes (i) a plurality of processing units, (ii) a plurality of caches arranged into a plurality of cache layers, the plurality of caches including a plurality of first caches within a first cache layer and one or more second caches within a second cache layer, a particular second cache in the second cache layer serving as a backing store for at least a particular first cache in the first cache layer, the method comprising:
receiving, from the particular first cache, a logging request referencing a particular memory address; and
based on the request, determining whether a cache line corresponding to the memory address is present in the particular second cache, and
when the cache line is not present in the particular second cache, performing one of:
causing the cache line to be logged when there does not exist a third cache that participates in logging and that serves as a backing store for at least the particular second cache, or
forwarding the request to the third cache when the third cache does exist; or
when the cache line is present in the particular second cache, performing at least one of:
causing the cache line to be logged when the cache line is (i) not determined by the particular second cache to be logged, or (ii) determined by the particular second cache to be logged but the particular second cache has not determined that the first cache is aware of a current value stored in the cache line of the particular second cache; or
determining that cache line need not be logged when (i) the cache line is determined by the particular second cache to be logged, and (ii) it is determined that the first cache is aware of the current value stored in the cache line of the particular second cache.

10. The method of claim 9, wherein causing the cache line to be logged comprises:
logging the cache line within a trace buffer; and
marking the cache line as being logged within the particular second cache.

11. The method of claim 9, wherein causing the cache line to be logged comprises one of:
instructing the first cache to log a value of the particular memory address directly; or instructing the first cache to log a reference to a prior log entry for the particular memory address.

12. The method of claim 9, wherein causing the cache line to be logged when the cache line is not determined by the particular second cache to be logged comprises:
   determining that the third cache exists, and
   causing the cache line to be logged by reference based on knowledge of the third cache.

13. The method of claim 9, wherein causing the cache line to be logged when the cache line is not determined by the particular second cache to be logged comprises:
   determining that the third cache layer exists, and
   notifying the third cache that the cache line has been logged by value by the particular second cache.

14. The method of claim 9, wherein the first cache layer comprises an L1 cache layer, and wherein the second cache layer comprises an L2 cache layer or an L3 cache layer.

15. The method of claim 9, the control logic also configuring at least the particular second cache to:
   receive a message from the first cache indicating that another cache line in the first cache that also corresponds to the memory address is marked as not logged within the first cache; and
   based on the message, mark the cache line as not logged within the particular second cache.

16. The method of claim 15, wherein the other cache line is marked as not logged within the first cache based on the other cache line being written to by a processing unit corresponding to the first cache while logging is disabled for the processing unit.

17. The method of claim 9, the control logic also configuring at least the particular second cache to:
   receive a message from the first cache requesting the cache line for writing; and
   send the cache line to the first cache, the cache line being marked as not logged based at least on logging being disabled for the first cache.

18. A microprocessor, comprising:
   a plurality of processing units;
   a plurality of caches arranged into a plurality of cache layers, the plurality of caches including a plurality of first caches within a first cache layer and one or more second caches within a second cache layer, the second cache layer serving as a backing store for at least a particular first cache in the first cache layer that corresponds to a particular processing unit of the plurality of processing units; and
   control logic that configures at least the particular first cache to perform at least the following:
      detect a write to a cache line in the first cache that has a logging status that has been set;
      based on detecting the write, determine whether logging is enabled for the particular processing unit, and
         based at least on logging being disabled for the particular processing unit, clear the logging status for the cache line and notify at least one of the one or more second caches that its logging status for the cache line should be cleared, or
         based at least on logging being enabled for the particular processing unit, retain the logging status for the cache line.

19. The microprocessor of claim 18, wherein the particular processing unit has the cache line in an owned state, and wherein the control logic also configures at least the particular first cache to notify at least one of the plurality of first caches that its logging status for the cache line should be cleared.

20. The microprocessor of claim 18, wherein the particular first cache to notifies the at least one of the plurality of first caches that its logging status for the cache line should be cleared based on a request received from the at least one of the plurality of first caches.

\* \* \* \* \*